(12) United States Patent
Matsui

(10) Patent No.: US 10,215,999 B2
(45) Date of Patent: Feb. 26, 2019

(54) MACRO LENS AND IMAGING UNIT

(71) Applicant: Sony Corporation, Tokyo (JP)

(72) Inventor: Takumi Matsui, Tokyo (JP)

(73) Assignee: Sony Corporation, Tokyo (JP)

(*) Notice: Subject to any disclaimer, the term of this patent is extended or adjusted under 35 U.S.C. 154(b) by 101 days.

(21) Appl. No.: 14/230,519

(22) Filed: Mar. 31, 2014

(65) Prior Publication Data
US 2014/0334014 A1 Nov. 13, 2014

(30) Foreign Application Priority Data

May 9, 2013 (JP) ................................. 2013-099511

(51) Int. Cl.
*G02B 15/00* (2006.01)
*G02B 27/64* (2006.01)
*G02B 15/177* (2006.01)

(52) U.S. Cl.
CPC ......... *G02B 27/646* (2013.01); *G02B 15/177* (2013.01)

(58) Field of Classification Search
CPC ............................ G02B 15/177; G02B 27/646
USPC ................................................. 359/641–797
See application file for complete search history.

(56) References Cited

U.S. PATENT DOCUMENTS

| 5,671,062 A * | 9/1997 | Nakamura | G02B 15/173 359/676 |
| 2007/0279743 A1* | 12/2007 | Kushida | G02B 15/173 359/557 |
| 2009/0046366 A1* | 2/2009 | Take | G02B 27/646 359/557 |
| 2012/0099202 A1* | 4/2012 | Hatakeyama | G02B 15/177 359/557 |
| 2013/0033621 A1* | 2/2013 | Maruyama | G02B 15/173 348/240.3 |

FOREIGN PATENT DOCUMENTS

JP 2011-048232 3/2011

* cited by examiner

*Primary Examiner* — Mohammed Hasan
*Assistant Examiner* — Vipin Patel
(74) *Attorney, Agent, or Firm* — Michael Best & Friedrich LLP

(57) ABSTRACT

A macro lens includes: a first focus lens group having negative refractive power; and a second focus lens group arranged closer to an image side than the first focus lens group is arranged and having positive refractive power. At time of performing a focusing operation from an object at infinite to an object at a close distance, the first focus lens group travels toward the image side, and the second focus lens group travels with a traveling amount different from a traveling amount of the first focus lens group. The second focus lens group is configured of only one positive lens.

9 Claims, 21 Drawing Sheets

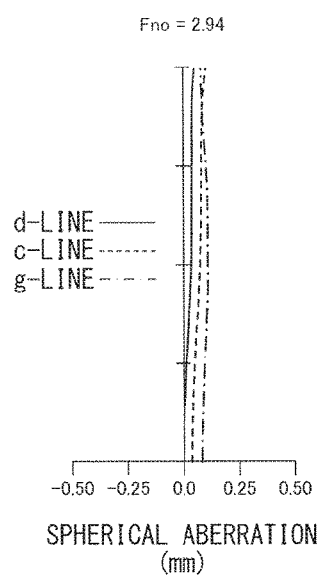
FIG. 2A SPHERICAL ABERRATION (mm)
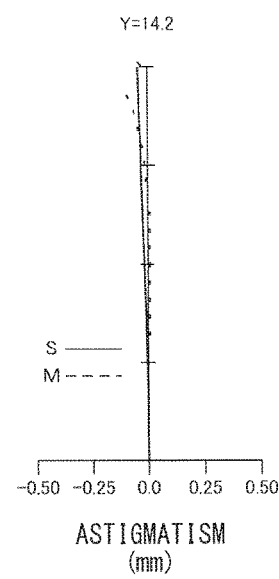
FIG. 2B ASTIGMATISM (mm)
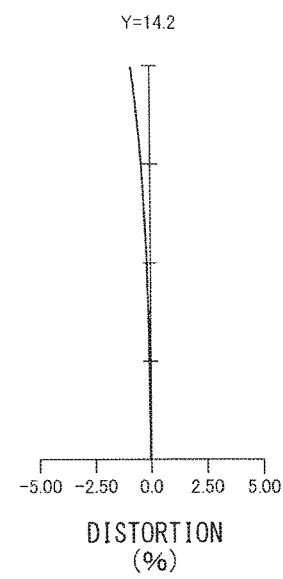
FIG. 2C DISTORTION (%)

SPHERICAL ABERRATION (mm)

ASTIGMATISM (mm)

DISTORTION (%)

SPHERICAL ABERRATION (mm)

ASTIGMATISM (mm)

DISTORTION (%)

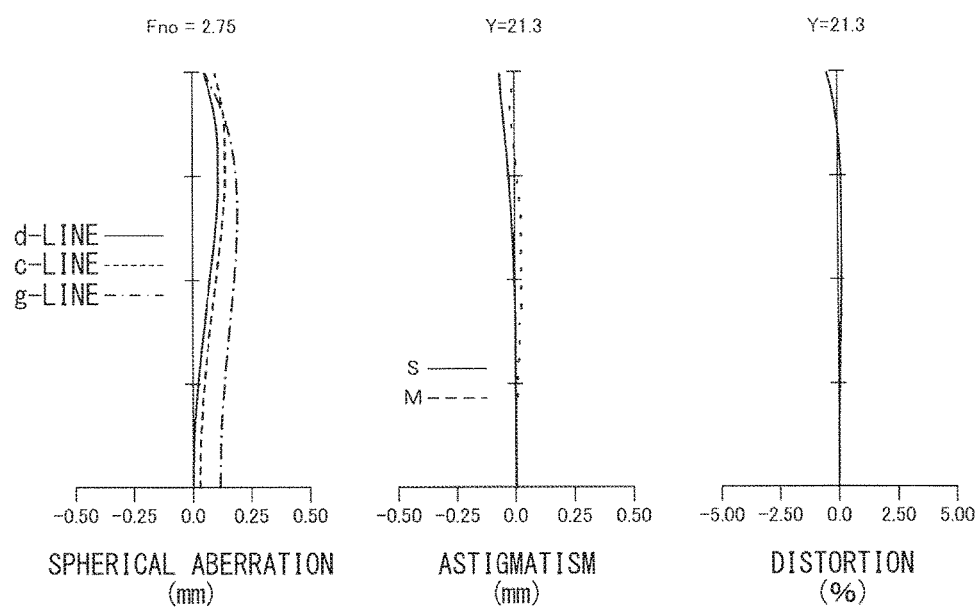

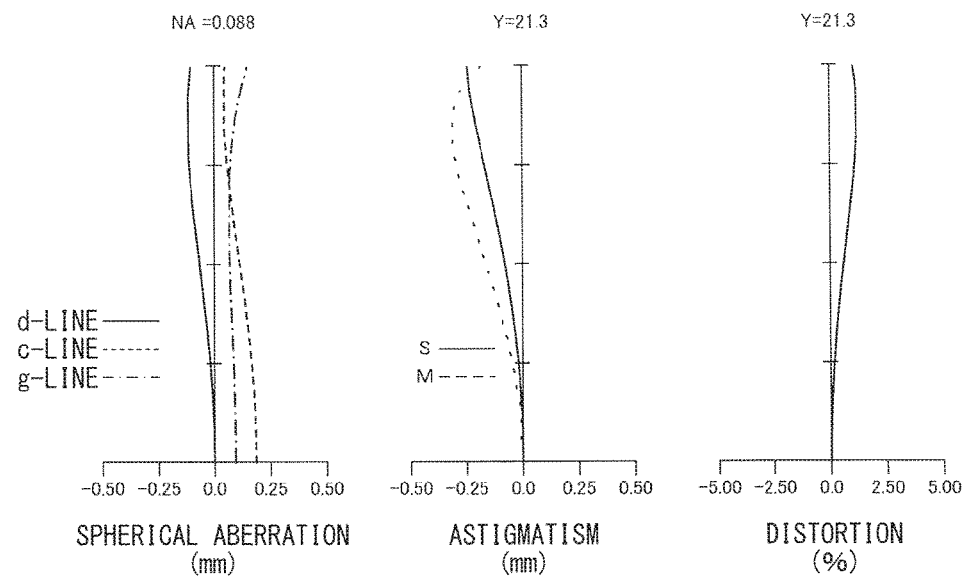

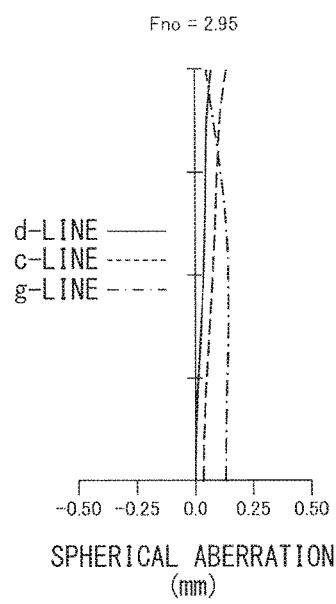 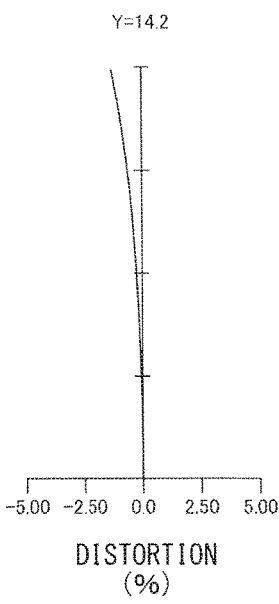
FIG. 14A  FIG. 14B  FIG. 14C

SPHERICAL ABERRATION (mm)

ASTIGMATISM (mm)

DISTORTION (%)

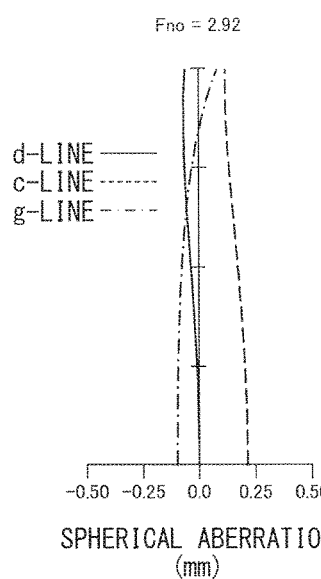
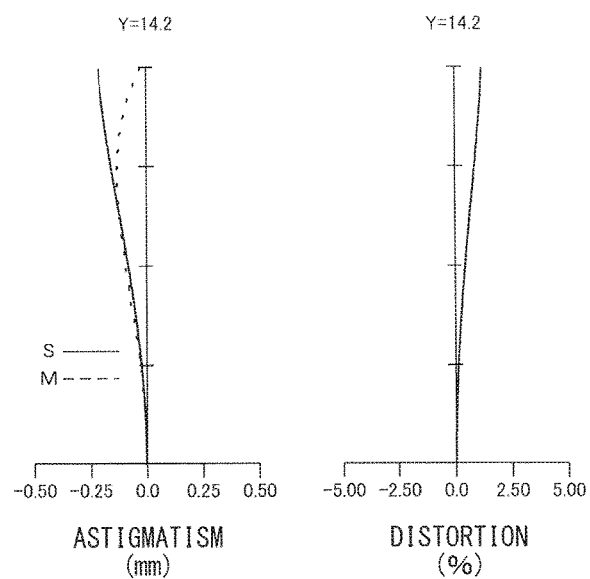
FIG. 20A  FIG. 20B  FIG. 20C

MACRO LENS AND IMAGING UNIT

CROSS-REFERENCE TO RELATED APPLICATIONS

This application claims the benefit of Japanese Priority Patent Application JP 2013-099511 filed May 9, 2013, the entire contents of each which are incorporated herein by reference.

BACKGROUND

The present technology relates to an optical system that is capable of performing close-distance shooting that is a so-called macro lens that may be desirably capable of shooting an object at infinite to an object at a close distance with equal shooting magnification and that has high imaging performance. In particular, the present technology relates to a macro lens that is used in an apparatus such as a still camera, a video camcorder, and a digital camera, and also relates to an imaging unit that uses such a macro lens.

In recent years, an imaging unit that is capable of shooting both a still image and a moving image by one imaging unit has been widely spread particularly in shooting with the use of a digital camera. For a lens for shooting used in such an imaging unit, not only higher speed of a focusing operation at the time of shooting a still image but higher speed of a focusing operation at the time of shooting a moving image has been desired since images are recorded almost all the time even during the focusing operation in shooting a moving image. In particular, an imaging unit has been widely used that has an automatic focusing mechanism of a contrast detection type. Therefore, in a lens for shooting that is used in such an imaging unit, there is provided a lens group, a so-called wobbling lens group, that slightly travels along an optical axis in order to detect a focusing position by contrast. It is to be noted that, since the focus lens group and the wobbling lens group both operate to allow the focal position to vary along the optical axis, one lens group has both functions and the focus lens group is not distinguished from the wobbling lens group in many cases.

In a so-called macro lens that is capable of performing a focusing operation from an object at the infinite to an object at a close distance with equal shooting magnification, a traveling amount of the focus lens group that travels at the time of performing the focusing operation is likely to be large. Therefore, in order to achieve a high-speed focusing operation by a focus motor, it is desirable to reduce the weight of the focus lens group. Further, when the focus lens group also serves as the wobbling lens group, higher speed is desired in operation. Therefore, it is further desirable to reduce the weight of the focus lens group. As such a macro lens, a macro lens is proposed that has five lens groups and three lens groups out of those five lens groups are used to perform the focusing operation (for example, see Japanese Unexamined Patent Application Publication No. 2011-048232).

SUMMARY

In the above-described existing art, three lens groups out of the five lens groups are used to perform the focusing operation. However, since each of the lens groups used to perform the focusing operation is configured of a plurality of lenses, it is difficult to reduce the weight. Therefore, such a configuration is not suitable for high-speed focusing operation and wobbling operation.

It is desirable to provide a macro lens that is capable of performing a high-speed focusing operation from an object at the infinite to an object with almost-equal shooting magnification and of performing a high-speed wobbling operation, and has favorable optical performance. It is also desirable to provide an imaging unit that uses the macro lens.

According to an embodiment of the present disclosure, there is provided a macro lens including: a first focus lens group having negative refractive power; and a second focus lens group arranged closer to an image side than the first focus lens group is arranged and having positive refractive power. At time of performing a focusing operation from an object at infinite to an object at a close distance, the first focus lens group travels toward the image side, and the second focus lens group travels with a traveling amount different from a traveling amount of the first focus lens group. The second focus lens group is configured of only one positive lens. This achieves a function that the weight of the focus lens group in the macro lens is reduced.

According to an embodiment of the present disclosure, there is provided a macro lens including: a first lens group having positive refractive power; a second lens group having negative refractive power and serving as a first focusing lens group; a third lens group having positive refractive power; a fourth lens group having positive refractive power and serving as a second focus lens group; and a fifth lens group having refractive power and arranged on an image side. The first to fifth lens groups are arranged in order from an object side along an optical axis. At time of performing a focusing operation from an object at infinite to an object at a close distance, a distance on the optical axis between image plane and each of the first lens group, the third lens group, and the fifth lens group is constant, the second lens group travels toward the image side, and the fourth lens group travels with a traveling amount different from a traveling amount of the second lens group. The fourth lens group is configured of only one positive lens. This achieves a function that the weight of the fourth lens group that serves as the focus lens group in the macro lens is reduced.

According to an embodiment of the present disclosure, there is provided a macro lens including: a first lens group having positive refractive power; a second lens group having negative refractive power and serving as a first focus lens group; a third lens group having positive refractive power and serving as a second focus lens group; and a fourth lens group having refractive power and arranged on an image side. The first to fourth lens groups are arranged in order from an object side along an optical axis. At time of performing a focusing operation from an object at infinite to an object at a close distance, a distance on the optical axis between image plane and each of the first lens group and the fourth lens group is constant, the second lens group travels toward the image side, and the third lens group travels with a traveling amount different from a traveling amount of the second lens group. The third lens group is configured of only one positive lens. This achieves a function that the weight of the third lens group that serves as the focus lens group in the macro lens is reduced.

According to an embodiment of the present disclosure, there is provided an imaging unit with a macro lens and an imaging device converting an optical image formed by the macro lens into an electric signal. The macro lens includes: a first focus lens group having negative refractive power; and a second focus lens group arranged closer to an image side than the first focus lens group is arranged and having positive refractive power. At time of performing a focusing operation from an object at infinite to an object at a close distance, the first focus lens group travels toward the image side, and the second focus lens group travels with a traveling amount different from a traveling amount of the first focus lens group. The second focus lens group is configured of only one positive lens. This achieves a function that the weight of the focus lens group in the macro lens applied to the imaging unit is reduced.

According to the above-described embodiments of the present technology, it is possible to achieve a superior effect that is to provide the macro lens that is capable of performing a high-speed focusing operation from an object at the infinite to an object with almost-equal shooting magnification and of performing a high-speed wobbling operation, and has favorable optical performance, and to provide an imaging unit that uses the macro lens.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 2A to 2C are various aberration diagrams of the macro lens of the first embodiment of the present technology in a state where a position at an infinite object distance is in focus.

FIGS. 6A to 6C are various aberration diagrams of the macro lens of the second embodiment of the present technology in a state where a position at an infinite object distance is in focus.

FIGS. 8A to 8C are various aberration diagrams of the macro lens of the second embodiment of the present technology in a state where a position at a shortest shooting distance is in focus that allows the shooting magnification to be equal magnification.

FIGS. 14A to 14C are various aberration diagrams of the macro lens of the fourth embodiment of the present technology in a state where a position at an infinite object distance is in focus.

FIGS. 20A to 20C are various aberration diagrams of the macro lens of the fifth embodiment of the present technology in a state where a position at a shortest shooting distance is in focus that allows the shooting magnification to be equal magnification.

DETAILED DESCRIPTION

Figure 1:
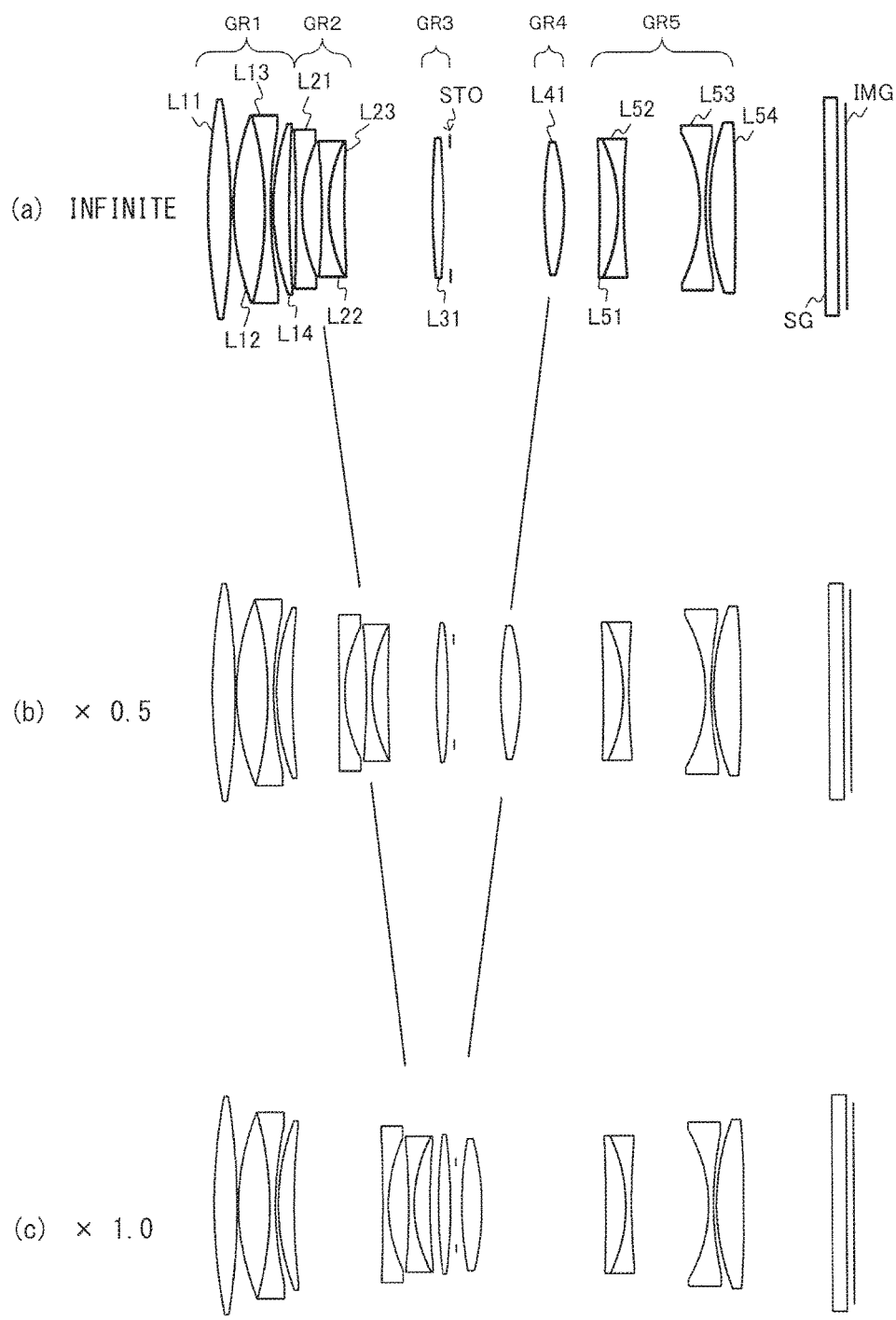
FIG. 1 is a diagram illustrating a lens configuration of a macro lens of a first embodiment of the present technology.
Figure 3A:
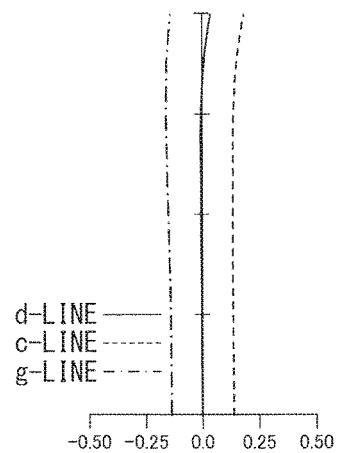
FIGS. 3A to 3C are various aberration diagrams of the macro lens of the first embodiment of the present technology in a state where a position at an intermediate distance is in focus that allows shooting magnification to be 0.5.
Figure 3B:
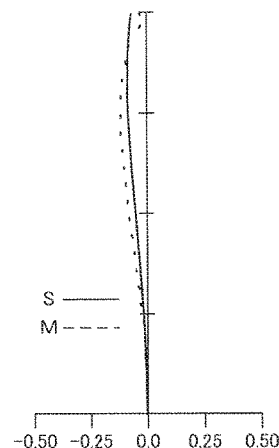
Figure 3C:
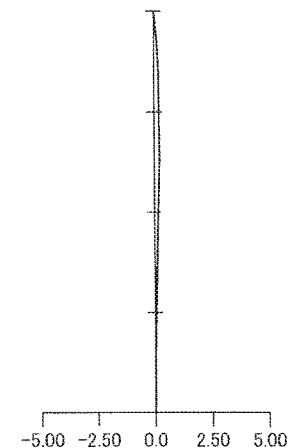

Some embodiments (hereinafter, referring to as "embodiments") for carrying out the present technology will be described below.

A macro lens according to an embodiment of the present technology includes a first focus lens group that has negative refractive power, and a second focus lens group that is arranged closer to an image side than the first focus lens group is arranged and that has positive refractive power. Also, the second focus lens group is configured of only one positive lens.

A first lens group that has positive refractive power is provided closer to an object side than the first focus lens group is arranged. A third lens group that has positive refractive power is provided between the first focus lens group and the second focus lens group. In this case, the first focus lens group is the second lens group, and the second focus lens group is the fourth lens group. A positive or negative fifth lens group is provided on the image side of the second focus lens group.

A so-called internal focus type is achieved in which, at the time of performing a focusing operation from an object at the infinite to an object at a close distance, the first focus lens group travels toward the image side, the second focus lens group travels toward the object side, and lens groups other than the focus lens groups have fixed positions with respect to image plane. By adopting the internal focus type, the focus lens group becomes relatively light in weight, and becomes suitable for reduction in electric power used for driving and reduction in noise. Also, by adopting the internal focus type, a traveling amount of the focus lens group becomes relatively short. Therefore, the speed of the focusing operation from the object at the infinite to the object at the close distance is allowed to be higher. Further, by configuring the second focus lens group of one positive lens, further reduction in weight is achieved. Therefore, high-speed wobbling at the time of performing an automatic focusing operation is achieved, and the speed of the focusing operation is allowed to be further higher.

Moreover, the macro lens according to an embodiment of the present technology may satisfy following Conditional expression (a).

$$55 < AF2 < 100 \qquad \text{Conditional expression (a):}$$

AF2 is an Abbe number of the positive lens configuring the second focus lens group. Conditional expression (a) defines the Abbe number of the positive lens configuring the second focus lens group within an appropriate range. If a value of AF2 is smaller than the lower limit in Conditional expression (a) and high dispersion is caused, an amount of variation in chromatic aberration at the time of performing a focusing operation onto the object at the close distance becomes large, which is not desirable. A material having a value of AF2 that is larger than the upper limit in Conditional expression (a) is an ultra-low dispersion material and therefore is extremely expensive, which is not preferable.

Moreover, in order to further achieve the above-described effect, it may be desirable to satisfy following Conditional expression (a').

$$60 < AF2 < 96 \qquad \text{Conditional expression (a'):}$$

The macro lens according to an embodiment of the present embodiment may satisfy following Conditional expression (b).

$$2.0 < GF2 < 4.5 \qquad \text{Conditional expression (b):}$$

GF2 is a specific gravity of the positive lens configuring the second focus lens group. Conditional expression (b) defines the specific gravity of a material of the positive lens configuring the second focus lens group within an appropriate range. If a value of GF2 is smaller than the lower limit in Conditional expression (b) and the specific gravity becomes small, it is difficult to use a glass material, and therefore, it is difficult to select a material other than a resin material having relatively-large dispersion, which is not preferable. On the other hand, if the value of GF2 is larger than the upper limit in Conditional expression (b) and the specific gravity becomes large, the weight of the second focus lens group is increased, and it becomes difficult to achieve reduction in power consumption at the time of driving, reduction in nose, or high speed.

Moreover, in order to further achieve the above-described effect, it may be desirable to satisfy following Conditional expression (b').

$$2.0 < GF2 < 4.0 \qquad \text{Conditional expression (b'):}$$

Further, the macro lens according to an embodiment of the present technology may include an image blur correction lens group between the first focus lens group and the second focus lens group. The image blur correction lens group is allowed to move in a direction perpendicular to the optical axis and corrects image blur when the optical system is shaken. When the image blur correction lens group is arranged between the first and second focus lens groups, it is possible to increase a ratio of amounts of movement in a vertical direction of an image on the image plane, i.e., image blur correction sensitivity, at the time when the image blur correction lens is moved in the vertical direction. Therefore, it is possible to correct the image blur with small moving amount. Thus, such an arrangement reduces the amount of movement in the vertical direction at the time of image blur correction. Therefore, compact size is achieved, and aberration variation at the time of image blur correction is allowed to be suppressed to a small amount.

Moreover, the macro lens according to an embodiment of the present technology may satisfy following Conditional expression (c).

$$1.0 < F3/F < 3.0 \qquad \text{Conditional expression (c):}$$

F3 is a focal length of the image blur correction lens group, and F is a total focal length of the macro lens in a state where the object at the infinite is in focus. Conditional expression (c) defines the focal length of the third lens group within an appropriate range. If a value of F3/F is smaller than the lower limit in Conditional expression (c) and the focal length of the third lens group becomes small, the refractive power of the third lens group becomes excessively strong, and therefore, aberration increases, which is not preferable. On the other hand, if the value of F3/F is larger than the upper limit in Conditional expression (c) and the focal length of the third lens group becomes large, the refractive power of the third lens group becomes excessively weak. Therefore, the amount of movement in the vertical direction at the time of the image blur correction becomes excessively large, and optical performance at the time of the image blur correction is degraded.

Moreover, in order to further achieve the above-described effect, it may be desirable to satisfy following Conditional expression (c').

$$1.3 < F3/F < 2.5 \qquad \text{Conditional expression (c'):}$$

The macro lens according to an embodiment of the present technology may include one positive lens as the image blur correction lens group. In particular, the image blur correction lens group may be configured of only one positive lens. By allowing the image blur correction lens group to be configured of one positive lens, the weight of the image blur correction lens group is reduced, and therefore, power consumption at the time of driving is reduced.

Further, the macro lens according to an embodiment of the present technology may satisfy following Conditional expression (d).

$$55 < AF3 < 100 \qquad \text{Conditional expression (d):}$$

AF3 is an Abbe number of the one positive lens configuring the image blur correction lens group. Conditional expression (d) defines the Abbe number of the one positive lens configuring the image blur correction lens group within an appropriate range. If a value of AF3 is smaller than the lower limit in Conditional expression (d) and high dispersion is caused, the amount of variation in chromatic aberration at the time of image blur correction on the object at the close distance becomes large, which may not be desirable. A material having an Abbe number that is larger than the upper limit in Conditional expression (d) is an ultra-low dispersion material and therefore is extremely expensive, which may not be preferable.

Another macro lens according to an embodiment of the present technology may include: a first lens group that has positive refractive power; a second lens group that has negative refractive power and serves as a first focusing lens group; a third lens group that has positive refractive power; a fourth lens group that has positive refractive power and serves as a second focus lens group; and a fifth lens group that has refractive power and is arranged on an image side. The first to fifth lens groups are arranged in order from an object side along an optical axis. At time of performing a focusing operation from an object at infinite to an object at a close distance, a distance on the optical axis between image plane and each of the first lens group, the third lens group, and the fifth lens group may be constant, the second lens group may travel toward the image side, and the fourth lens group may travel with a traveling amount different from a traveling amount of the second lens group. The fourth lens group may be configured of only one positive lens. By adopting such a configuration, the focusing operation is performed through varying magnification of an image formed by the most-object-sided first lens group by allowing the second lens group to travel on the optical axis. Further, the third to fifth lens groups allow the image the magnification of which is varied by the second lens group to be formed on the image plane. By allowing the fourth lens group to travel on the optical axis, the magnification variation during the focusing operation is borne and variation in aberration is corrected.

Moreover, in this macro lens, the fifth lens group as a whole may have negative refractive power. By allowing the fifth lens group to have negative refractive power, the total length of the optical system is reduced, and the traveling amounts of the first and second focus lens groups that are necessary at the time of performing the focusing operation toward the object at the close distance are reduced.

Moreover, the fifth lens group may have two negative lenses and one positive lens. By allowing the fifth lens group to have two negative lenses and one positive lens, occurrence of magnification chromatic aberration, distortion, and field curvature in the fifth lens group is suppressed.

This macro lens may satisfy following Conditional expression (e).

$$1.0 < \beta 5 < 1.8 \qquad \text{Conditional expression (e):}$$

β5 is a lateral magnification of the fifth lens group. Conditional expression (e) appropriately defines a range of the lateral magnification of the fifth lens group. If a value of β5 is smaller than the lower limit in Conditional expression (e) and the lateral magnification becomes small, the total focal length of the first to fourth lens groups is increased, which results in increase in size of the optical system. If the value of β5 is larger than the upper limit in Conditional expression (e) and the lateral magnification becomes large, an effect of the fifth lens group that expands aberrations is increased, and therefore, correction of aberrations becomes difficult.

This macro lens may satisfy following Conditional expression (f).

$$0.4 < F1/F < 0.8 \qquad \text{Conditional expression (f):}$$

F1 is a focal length of the first lens group, and F is a total focal length of the macro lens in a state where the object at the infinite is in focus. Conditional expression (f) defines the focal length of the first lens group within an appropriate range. If a value of F1/F is smaller than the lower limit in Conditional expression (f) and the refractive power of the first lens group becomes excessively strong, spherical aberration and comma aberration are increased, which is not favorable. If the value of F1/F is larger than the upper limit in Conditional expression (f), the refractive power of the first lens group becomes excessively weak, and therefore, reduction in size of the optical system becomes difficult, which is not favorable.

This macro lens may satisfy following Conditional expression (g).

$$0.3 < |F2|/F < 0.6 \qquad \text{Conditional expression (g):}$$

F2 is a focal length of the second lens group, and F is a total focal length of the macro lens in a state where the object at the infinite is in focus. Conditional expression (g) defines the focal length of the second lens group within an appropriate range. If a value of |F2|/F is smaller than the lower limit in Conditional expression (g), and the refractive power of the second lens group becomes excessively strong, variation in field curvature due to the focusing operation is increased, which is not favorable. If the value of |F2|/F is larger than the upper limit in Conditional expression (g), the refractive power of the second lens group becomes excessively weak, and therefore, reduction in size of the optical system becomes difficult, which is not favorable.

Still another macro lens according to an embodiment of the present technology may include: a first lens group that has positive refractive power; a second lens group that has negative refractive power and serves as a first focus lens group; a third lens group that has positive refractive power and serves as a second focus lens group; and a fourth lens group that has refractive power and is arranged on an image side. The first to fourth lens groups are arranged in order from an object side along an optical axis. At time of performing a focusing operation from an object at infinite to an object at a close distance, a distance on the optical axis between image plane and each of the first lens group and the fourth lens group may be constant, the second lens group may travel toward the image side, and the third lens group may travel with a traveling amount different from a traveling amount of the second lens group. The third lens group may be configured of only one positive lens. This configuration corresponds to a configuration obtained by removing the third lens group from other macro lenses described above. Therefore, the corresponding lens groups have similar characteristics.

The imaging unit according to an embodiment of the present technology includes the above-described macro lens and an imaging device that converts an optical image formed by the macro lens into an electric signal.

Numerical examples of the above-described embodiments of the present technology will be described below. The description will be provided in the following order.
1. First Embodiment (Numerical Example 1)
2. Second Embodiment (Numerical Example 2)
3. Third Embodiment (Numerical Example 3)
4. Fourth Embodiment (Numerical Example 4)
5. Fifth Embodiment (Numerical Example 5)
6. Application Example (Imaging Unit)

Symbols etc. in tables and the description below represent the following. "si" represents a surface number that represents an i-th surface counted from the object side. "ri" represents a curvature radius of the i-th surface counted from the object side. "di" represents an on-axial surface spacing between the i-th surface and the (i+1)th surface counted from the object side. "ni" represents a refractive index of the d-line (having a wavelength of 587.6 nm) of a glass material or a material that has the i-th surface on the object side. "vi" represents an Abbe number, with respect to the d-line, of the glass material or the material that has the i-th surface on the object side. "∞" related to the curvature radius indicates that the relevant surface is a planar surface. "ASP" in the column of the aspherical surface indicates that the relevant surface has an aspherical shape. "f" represents a total focal length of the lens. "Fno" represents an open F number. "ω" represents a half angle of view.

Some lenses used in the respective embodiments have a lens surface that is aspherical as described above. The aspherical surface is defined by the following expression, where "x" is a distance (sag amount) from a vertex of the lens surface along the optical axis, "y" is a height in a direction perpendicular to the optical axis, "c" is a paraxial curvature at the vertex of the lens, and "κ" is a conic constant.

$$x = y^2 c^2 / (1 + (1 - (1+\kappa)y^2 c^2)^{1/2}) + A4y^4 + A6y^6 + A8y^8 + A10y^{10}$$

It is to be noted that A4, A6, A8, and A10 are aspherical surface coefficients of 4th order, 6th order, 8th order, and 10th order, respectively.

[1. First Embodiment]
[Lens Configuration]

FIG. 1 is a diagram illustrating a lens configuration of a macro lens of a first embodiment of the present technology. In FIG. 1, Part (a) shows a lens arrangement in a state where a position at an infinite object distance is in focus, Part (b) shows a lens arrangement in a state where a position at an intermediate distance is in focus that allows shooting magnification to be 0.5, and Part (c) shows a lens arrangement in a state where a position at a shortest shooting distance is in focus that allows the shooting magnification to be equal magnification.

This macro lens of the first embodiment includes a first lens group GR1, a second lens group GR2, a third lens group GR3, a fourth lens group GR4, and a fifth lens group GR5 that are arranged in order from the object side. The first lens group GR1 has positive refractive power. The second lens group GR2 has negative refractive power and serves as the first focus lens group. The third lens group GR3 has positive refractive power and serves as the image blur correction lens group. The fourth lens group GR4 has positive refractive power and serves as the second focus lens group. The fifth lens group GR5 has negative refractive power. At the time of performing a focusing operation from an object at the infinite to an object at a close distance, the first focus lens group travels toward the image side, and the second focus lens group travel toward the object side.

The first lens group GR1 is configured of four lenses that are a positive lens L11 , a cemented lens configured of a positive lens L12 and a negative lens L13, and a positive lens L14. By allowing the first lens group GR1 to have such a configuration, aspherical aberration, comma aberration, and chromatic aberration are corrected effectively in an entire range of focusing from the infinite to a close distance.

The second lens group GR 2 is configured of a negative lens L21, and a cemented lens configured of a negative lens L22 and a positive lens L23. By allowing the second lens group GR2 to have such a configuration, variation in field curvature and in magnification chromatic aberration caused by the focusing operation is corrected.

The third lens group GR3 is configured of one positive lens L31 that has an aspherical surface. By allowing at least one surface in the third lens group GR3 to be aspherical, variation in optical performance at the time of the image blur correction is particularly suppressed to a small amount.

The fourth lens group GR4 is configured of one positive lens L41 that has an aspherical surface. By allowing at least one surface in the fourth lens group GR4 to be aspherical, variation in spherical aberration and in field curvature at the time of performing the focusing operation is suppressed.

The fifth lens group GR5 is configured of four lenses that are a negative cemented lens configured of a positive lens L51 and a negative lens L52, a negative lens L53, and a positive lens L54. By allowing the fifth lens group GR5 to have negative refractive power as a whole, a telephoto ratio is improved, and the total length of the macro lens is allowed to be reduced.

It is to be noted that an aperture stop STO is arranged between the third lens group GR3 and the fourth lens group GR4. Further, a filter SG is arranged between the fifth lens group GR5 and image plane IMG.

[Specifications of Macro Lens]

Table 1 shows lens data of Numerical example 1 to which specific numerical values are applied to the macro lens of the first embodiment.

TABLE 1

| si | Aspherical surface | ri | di | ni | vi |
|---|---|---|---|---|---|
| 1 | | 83.574 | 3.10 | 1.7550 | 52.3 |
| 2 | | −98.763 | 0.40 | | |
| 3 | | 36.138 | 4.35 | 1.6230 | 58.1 |
| 4 | | −48.194 | 0.80 | 1.8467 | 23.7 |
| 5 | | 55.977 | 0.40 | | |
| 6 | | 33.482 | 2.20 | 1.6968 | 55.4 |
| 7 | | 123.575 | d7 | | |
| 8 | | −397.323 | 0.80 | 1.7292 | 54.6 |
| 9 | | 21.775 | 2.94 | | |
| 10 | | −99.595 | 0.80 | 1.6968 | 55.4 |
| 11 | | 20.463 | 2.20 | 1.8467 | 23.7 |
| 12 | | 112.363 | d12 | | |
| 13 | ASP | 83.650 | 1.61 | 1.4971 | 81.5 |
| 14 | | −112.358 | 1.00 | | |
| 15 | Aperture stop | ∞ | d15 | | |
| 16 | | 53.411 | 2.85 | 1.5920 | 67 |
| 17 | ASP | −36.626 | d17 | | |
| 18 | | −229.747 | 2.75 | 1.7170 | 47.9 |
| 19 | | −21.951 | 0.80 | 1.5927 | 35.4 |
| 20 | | 115.751 | 10.78 | | |
| 21 | | −21.605 | 0.80 | 1.5970 | 35.4 |
| 22 | | 54.084 | 0.50 | | |
| 23 | | 33.000 | 3.70 | 1.4875 | 70.4 |
| 24 | | −231.610 | 12.50 | | |
| 25 | | ∞ | 2.00 | 1.4875 | 70.4 |
| 26 | | ∞ | | | |

In this macro lens of the first embodiment, an object-sided surface (the 13th surface) of the positive lens L31 in the third lens group GR3 and an image-sided surface (the 17th surface) of the positive lens L41 in the fourth lens group GR4 are formed to be aspherical. Table 2 shows the conic constant κ and the aspherical surface coefficients A4, A6, A8, and A10 of 4th order, 6th order, 8th order, and 10th order of each of these surfaces. It is to be noted that, in table 2 and tables below showing the aspherical surface coefficients, "E-i" represents an exponential expression having 10 as a base, i.e., "$10^{-i}$". To give an example, "0.12345E−05" represents "$0.12345 \times 10^{-5}$".

TABLE 2

| si | κ | A4 | A6 | A8 | A10 |
|---|---|---|---|---|---|
| 13 | −6.57E−10 | −2.2226E−06 | 8.9098E−09 | −9.4388E−11 | 0.0000E+00 |
| 17 | −2.07E−07 | 5.4782E−06 | 5.3033E−09 | −3.6559E−11 | 0.0000E+00 |

This macro lens of the first embodiment has a focal length f of 60.00, an F number Fno of 2.94, and a half angle of view ω of 13.4 degrees.

In this macro lens of the first embodiment, at the time of performing the focusing operations from the object at the infinite to the object at the close distance, a distance on the optical axis between the image plane and each of the first lens group GR1, the third lens group GR3, and the fifth lens group GR5 is constant. On the other hand, the second lens group GR2 travels toward the image side, and the fourth lens group GR4 travels with a traveling amount that is different from a traveling amount of the second lens group GR2. Therefore, a spacing d7 between the first lens group GR1 and the second lens group GR2, a spacing d12 between the second lens group GR2 and the third lens group GR3, a spacing d15 between the aperture stop STO and the fourth lens group GR4, and a spacing d17 between the fourth lens group GR4 and the fifth lens group GR5 vary. Table 3 shows variable spacings, of the respective surface spacings in this case, in a state where the position at the infinite object distance is in focus, in a state where the position at the intermediate distance is in focus that allows the shooting magnification to be 0.5, and in a state where the position at the shortest shooting distance is in focus that allows the shooting magnification to be equal magnification.

TABLE 3

| Shooting magnification | 0.0 | −0.5 | −1.0 |
|---|---|---|---|
| Total length of lens | 90 | 90 | 90 |
| d7 | 1.065 | 6.628 | 12.342 |
| d12 | 12.477 | 6.914 | 1.200 |
| d15 | 13.199 | 6.453 | 0.700 |
| d17 | 4.978 | 11.724 | 17.477 |

[Aberration of Macro Lens]

Figure 4A:
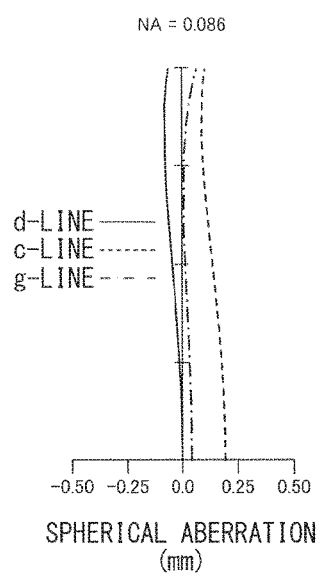
FIGS. 4A to 4C are various aberration diagrams of the macro lens of the first embodiment of the present technology in a state where a position at a shortest shooting distance is in focus that allows the shooting magnification to be equal magnification.
Figure 4B:
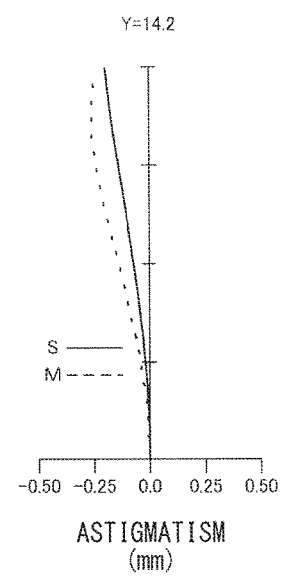
Figure 4C:
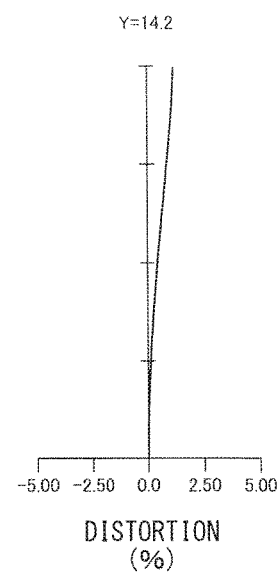

FIGS. 2A to 4C are various aberration diagrams of the macro lens of the first embodiment of the present technology. FIGS. 2A to 2C show aberration diagrams in a state where the position at the infinite object distance is in focus. FIGS. 3A to 3C show aberration diagrams in a state where the position at the intermediate distance is in focus that allows the shooting magnification to be 0.5. FIGS. 4A to 4C show aberration diagrams in a state where the position at the shortest shooting distance is in focus that allows the shooting magnification to be equal magnification. In these diagrams, FIGS. 2A, 3A, and 4A each show a spherical aberration diagram, FIGS. 2B, 3B, and 4B each show an astigmatism diagram (a field curvature diagram), and FIGS. 2C, 3C, and 4C each show a distortion diagram.

It is to be noted that, in these spherical aberration diagrams and spherical aberration diagrams below, a solid line shows values of a d-line (having a wavelength of 587.6 nm), a dashed line shows values of a c-line (having a wavelength of 656.3 nm), and a dashed-dotted line shows values of a g-line (having a wavelength of 435.8 nm). In these astigmatism diagrams and astigmatism diagrams below, a solid line shows values at a sagittal image plane of the d-line, and a dashed line shows values at a meridional image plane of the d-line. In these distortion diagrams and distortion diagrams below, a solid line shows values of the d-line. In these spherical aberration diagram and aberration diagrams below, "Fno" in a vertical axis represents an open F number, and "NA" represents a numerical aperture. In these astigmatism diagrams and these distortion diagrams, and in astigmatism diagrams and distortion diagrams below, "Y" in a vertical axis represents an image height in millimeters.

As can be clearly seen from the respective aberration diagrams, various aberrations are favorably corrected in Numerical example 1, and the macro lens of Numerical example 1 has superior imaging performance.

[2. Second Embodiment]
[Lens Configuration]

Figure 5:
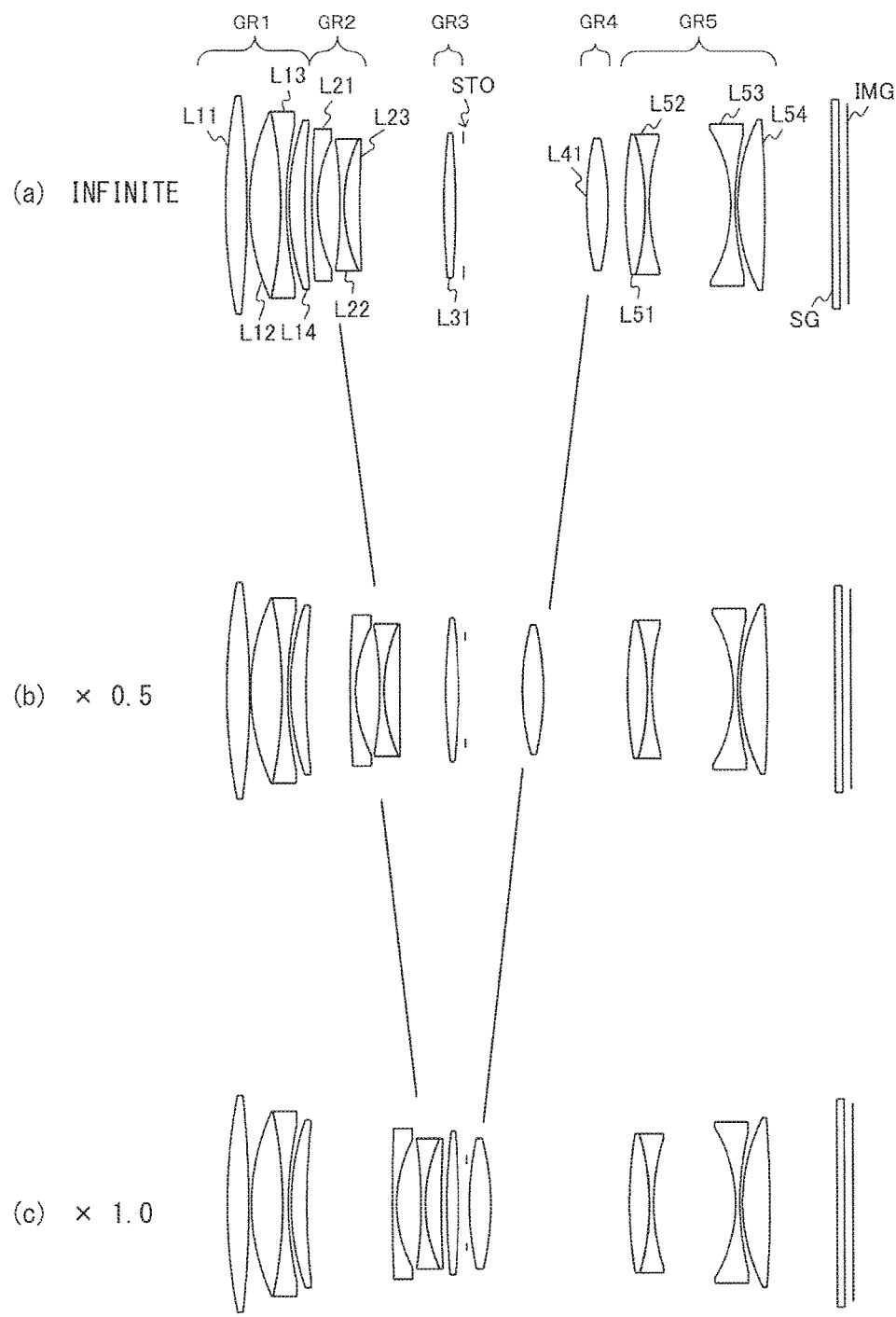
FIG. 5 is a diagram illustrating a lens configuration of a macro lens of a second embodiment of the present technology.
Figures 7A, 7B, 7C:
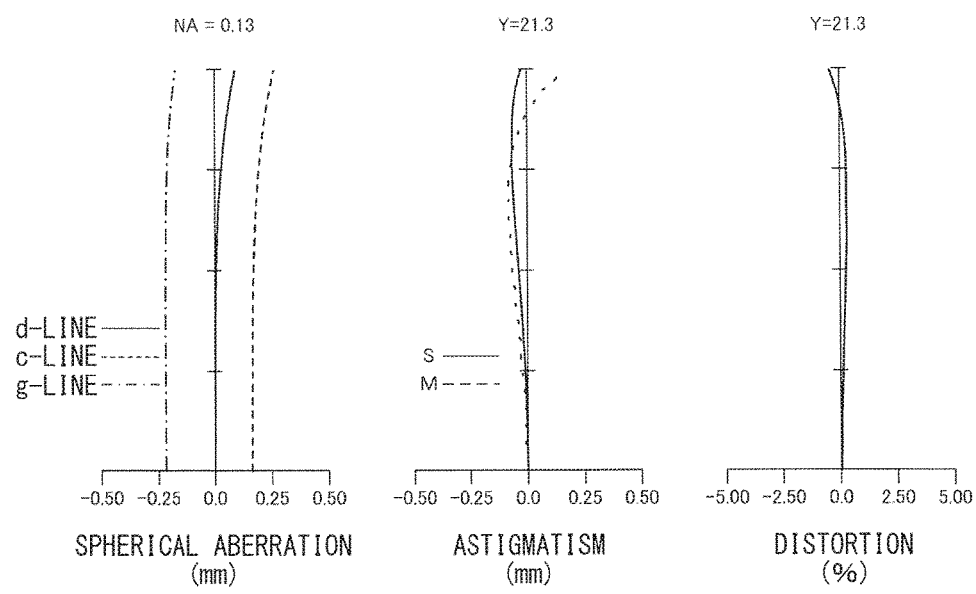
FIGS. 7A to 7C are various aberration diagrams of the macro lens of the second embodiment of the present technology in a state where a position at an intermediate distance is in focus that allows shooting magnification to be 0.5.

FIG. 5 is a diagram illustrating a lens configuration of a macro lens of a second embodiment of the present technology. In FIG. 5, Part (a) shows a lens arrangement in a state where a position at an infinite object distance is in focus, Part (b) shows a lens arrangement in a state where a position at an intermediate distance is in focus that allows shooting magnification to be 0.5, and Part (c) shows a lens arrangement in a state where a position at a shortest shooting distance is in focus that allows the shooting magnification to be equal magnification.

This macro lens of the second embodiment includes a first lens group GR1, a second lens group GR2, a third lens group GR3, a fourth lens group GR4, and a fifth lens group GR5 that are arranged in order from the object side. The first lens group GR1 has positive refractive power. The second lens group GR2 has negative refractive power and serves as the first focus lens group. The third lens group GR3 has positive refractive power and serves as the image blur correction lens group. The fourth lens group GR4 has positive refractive power and serves as the second focus lens group. The fifth lens group GR5 has negative refractive power. At the time of performing the focusing operation from the object at the infinite to the object at a close distance, the first focus lens group travels toward the image side, and the second focus lens group travels toward the object side.

The first lens group GR1 is configured of four lenses that are a positive lens L11, a cemented lens configured of a positive lens L12 and a negative lens L13, and a positive lens L14. By allowing the first lens group GR1 to have such a configuration, aspherical aberration, comma aberration, and chromatic aberration are corrected effectively in an entire range of focusing from the infinite to the close distance.

The second lens group GR2 is configured of a negative lens L21, and a cemented lens configured of a negative lens L22 and a positive lens L23. By allowing the second lens group GR2 to have such a configuration, variation in field curvature and in magnification chromatic aberration caused by the focusing operation is corrected.

The third lens group GR3 is configured of one positive lens L31 that has an aspherical surface. By allowing at least one surface in the third lens group GR3 to be aspherical, variation in optical performance at the time of the image blur correction is particularly suppressed to a small amount.

The fourth lens group GR4 is configured of one positive lens L41 that has an aspherical surface. By allowing at least one surface in the fourth lens group GR4 to be aspherical, variation in spherical aberration and in field curvature at the time of performing the focusing operation is suppressed.

The fifth lens group GR5 is configured of four lenses that are a negative cemented lens configured of a positive lens L51 and a negative lens L52, a negative lens L53, and a positive lens L54. By allowing the fifth lens group GR5 to have negative refractive power as a whole, a telephoto ratio is improved, and the total length of the macro lens is allowed to be reduced.

It is to be noted that an aperture stop STO is arranged between the third lens group GR3 and the fourth lens group GR4. Further, a filter SG is arranged between the fifth lens group GR5 and image plane IMG.

[Specifications of Macro Lens]

Table 4 shows lens data of Numerical example 2 to which specific numerical values are applied to the macro lens of the second embodiment.

TABLE 4

| si | Aspherical surface | ri | di | ni | vi |
|---|---|---|---|---|---|
| 1 | | 131.000 | 4.80 | 1.8348 | 42.7 |
| 2 | | −179.990 | 0.50 | | |
| 3 | | 49.085 | 6.70 | 1.5928 | 68.6 |
| 4 | | −91.459 | 1.20 | 1.9211 | 22.4 |
| 5 | | 84.243 | 0.60 | | |
| 6 | | 52.651 | 3.50 | 1.6968 | 55.4 |
| 7 | | 202.184 | d7 | | |
| 8 | | 265.182 | 1.10 | 1.7200 | 50.3 |
| 9 | | 30.207 | 5.09 | | |
| 10 | | −92.360 | 0.90 | 1.6968 | 55.4 |
| 11 | | 32.323 | 3.40 | 1.8467 | 23.7 |
| 12 | | 425.616 | d12 | | |
| 13 | ASP | 137.298 | 2.70 | 1.4971 | 81.5 |
| 14 | | −147.799 | 1.50 | | |
| 15 | Aperture stop | ∞ | d15 | | |
| 16 | | 61.449 | 4.60 | 1.4971 | 81.5 |
| 17 | ASP | −58.158 | d17 | | |
| 18 | | 83.738 | 4.30 | 1.7290 | 54 |
| 19 | | −54.777 | 0.85 | 1.5407 | 47.2 |
| 20 | | 47.330 | 17.74 | | |
| 21 | | −31.445 | 1.00 | 1.6889 | 31.1 |
| 22 | | 60.794 | 0.70 | | |
| 23 | | 39.939 | 5.80 | 1.4875 | 70.4 |
| 24 | | −307.929 | 14.43 | | |
| 25 | | ∞ | 2.00 | 1.4875 | 70.4 |
| 26 | | ∞ | | | |

In this macro lens of the second embodiment, an object-sided surface (the 13th surface) of the positive lens L31 in the third lens group GR3 and an image-sided surface (the 17th surface) of the positive lens L41 in the fourth lens group GR4 are formed to be aspherical. Table 5 shows the conic constant κ and the aspherical surface coefficients A4, A6, A8, and A10 of 4th order, 6th order, 8th order, and 10th order of each of these surfaces.

TABLE 5

| si | κ | A4 | A6 | A8 | A10 |
|---|---|---|---|---|---|
| 13 | −11.965 | 0.0000E+00 | 0.0000E+00 | 0.0000E+00 | 0.0000E+00 |
| 17 | −3.256 | 0.0000E+00 | 0.0000E+00 | 0.0000E+00 | 0.0000E+00 |

This macro lens of the second embodiment has a focal length f of 90.00, an F number Fno of 2.75, and a half angle of view ω of 13.4 degrees.

In this macro lens of the second embodiment, at the time of performing the focusing operation from the object at the infinite to the object at the close distance, a distance on the optical axis between the image plane and each of the first lens group GR1, the third lens group GR3, and the fifth lens group GR5 is constant. On the other hand, the second lens group GR2 travels toward the image side, and the fourth lens group GR4 travels with a traveling amount that is different from a traveling amount of the second lens group GR2. Therefore, a spacing d7 between the first lens group GR1 and the second lens group GR2, a spacing d12 between the second lens group GR2 and the third lens group GR3, a spacing d15 between the aperture stop STO and the fourth lens group GR4, and a spacing d17 between the fourth lens group GR4 and the fifth lens group GR5 vary. Table 6 shows variable spacings of the respective surface spacings in this case, in a state where the position at the infinite object distance is in focus, in a state where the position at the intermediate distance is in focus that allows the shooting magnification to be 0.5, and in a state where the position at the shortest shooting distance is in focus that allows the shooting magnification to be equal magnification.

TABLE 6

| Shooting magnification | 0.0 | −0.5 | −1.0 |
|---|---|---|---|
| Total length of lens | 90 | 90 | 90 |
| d7 | 1.449 | 9.581 | 18.306 |
| d12 | 18.056 | 9.925 | 1.200 |
| d15 | 26.931 | 12.553 | 0.700 |
| d17 | 3.661 | 18.038 | 29.892 |

[Aberration of Macro Lens]

FIGS. 6A to 8C are various aberration diagrams of the macro lens of the second embodiment of the present technology. FIGS. 6A to 6C show aberration diagrams in a state where the position at the infinite object distance is in focus. FIGS. 7A to 7C show aberration diagrams in a state where the position at the intermediate distance is in focus that allows the shooting magnification to be 0.5. FIGS. 8A to 8C show aberration diagrams in a state where the position at the shortest shooting distance is in focus that allows the shooting magnification to be equal magnification. In these diagrams, FIGS. 6A, 7A, and 8A each show a spherical aberration diagram, FIGS. 6B, 7B, and 8B each show an astigmatism diagram (a field curvature diagram), and FIGS. 6C, 7C, and 8C each show a distortion diagram.

It is to be noted that, in these spherical aberration diagrams and spherical aberration diagrams below, a solid line shows values of a d-line (having a wavelength of 587.6 nm), a dashed line shows values of a c-line (having a wavelength of 656.3 nm), and a dashed-dotted line shows values of a g-line (having a wavelength of 435.8 nm). In these astigmatism diagrams and astigmatism diagrams below, a solid line shows values at a sagittal image plane of the d-line, and a dashed line shows values at a meridional image plane of the d-line. In these distortion diagrams and distortion diagrams below, a solid line shows values of the d-line.

As can be clearly seen from the respective aberration diagrams, various aberrations are favorably corrected in Numerical example 2, and the macro lens of Numerical example 2 has superior imaging performance.

[3. Third Embodiment]

[Lens Configuration]

Figure 9:
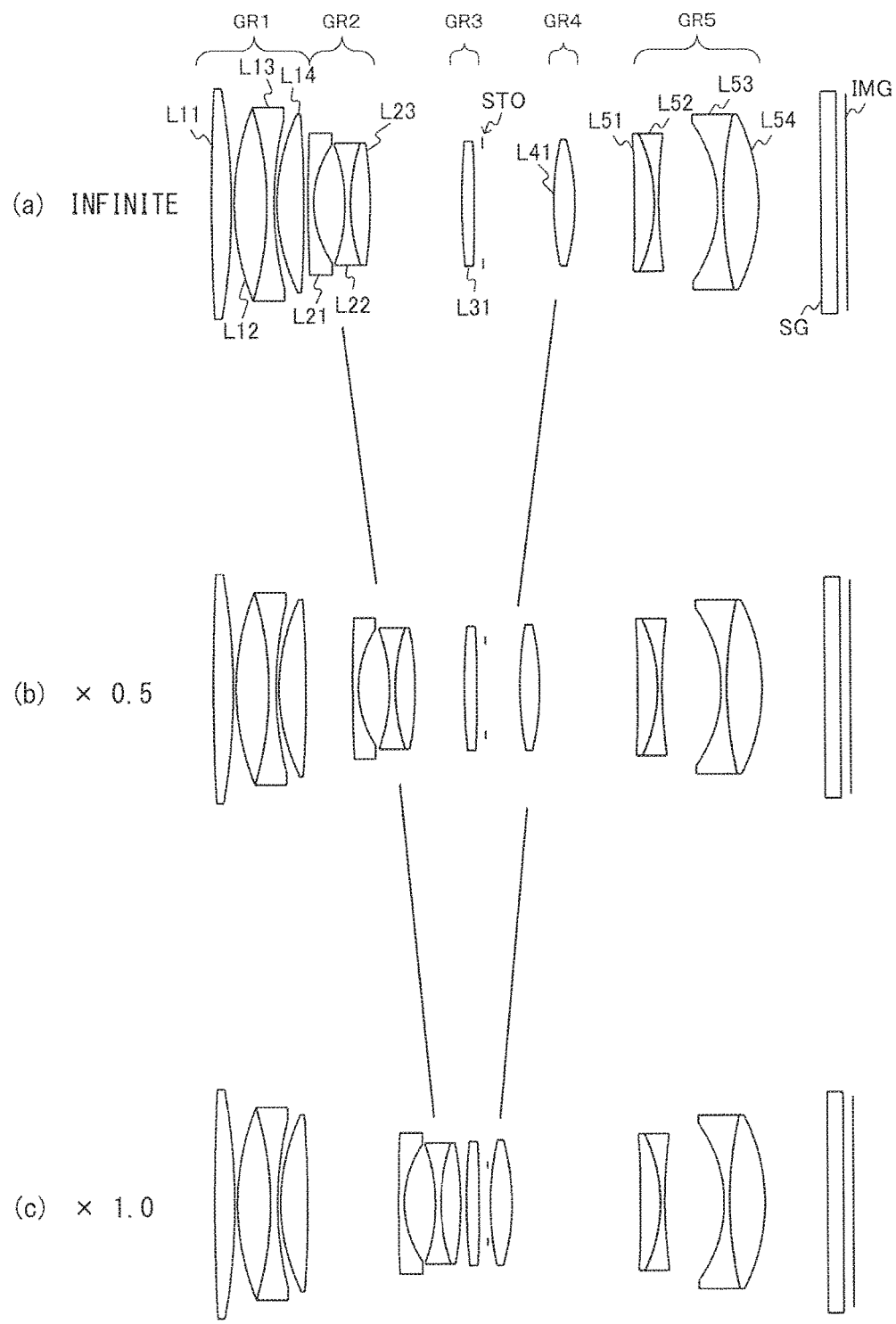
FIG. 9 is a diagram illustrating a lens configuration of a macro lens of a third embodiment of the present technology.

FIG. 9 is a diagram illustrating a lens configuration of a macro lens of a third embodiment of the present technology. In FIG. 9, Part (a) shows a lens arrangement in a state where a position at an infinite object distance is in focus, Part (b) shows a lens arrangement in a state where a position at an intermediate distance is in focus that allows shooting magnification to be 0.5, and Part (c) shows a lens arrangement in a state where a position at a shortest shooting distance is in focus that allows the shooting magnification to be equal magnification.

This macro lens of the third embodiment includes a first lens group GR1, a second lens group GR2, a third lens group GR3, a fourth lens group GR4, and a fifth lens group GR5 that are arranged in order from the object side. The first lens group GR1 has positive refractive power. The second lens group GR2 has negative refractive power and serves as the first focus lens group. The third lens group GR3 has positive refractive power and serves as the image blur correction lens group. The fourth lens group GR4 has positive refractive power and serves as the second focus lens group. The fifth lens group GR5 has negative refractive power. At the time of performing the focusing operation from the object at the infinite to the object at a close distance, the first focus lens group travels toward the image side, and the second focus lens group travel toward the object side.

The first lens group GR1 is configured of four lenses that are a positive lens L11, a cemented lens configured of a positive lens L12 and a negative lens L13, and a positive lens L14 that has an aspherical surface. By allowing the first lens group GR1 to have such a configuration, aspherical aberration, comma aberration, and chromatic aberration are corrected effectively in an entire range of focusing from the infinite to the close distance.

The second lens group GR2 is configured of a negative lens L21 that has an aspherical surface, and a cemented lens configured of a negative lens L22 and a positive lens L23. By allowing the second lens group GR2 to have such a configuration, variation in field curvature and in magnification chromatic aberration caused by the focusing operation is corrected.

The third lens group GR3 is configured of one positive lens L31 that has aspherical surfaces on both sides thereof. By allowing both surfaces in the third lens group GR3 to be aspherical, variation in optical performance at the time of the image blur correction is particularly suppressed to a small amount.

The fourth lens group GR4 is configured of one positive lens L41 that has aspherical surfaces on both sides thereof. By allowing both surfaces in the fourth lens group GR4 to be aspherical, variation in spherical aberration and in field curvature at the time of performing the focusing operation is suppressed.

The fifth lens group GR5 is configured of four lenses that are a negative cemented lens configured of a positive lens L51 and a negative lens L52, and a cemented lens configured of a negative lens L53 and a positive lens L54. By allowing the fifth lens group GR5 to have negative refractive power as a whole, a telephoto ratio is improved, and the total length of the macro lens is allowed to be reduced.

It is to be noted that an aperture stop STO is arranged between the third lens group GR3 and the fourth lens group GR4. Further, a filter SG is arranged between the fifth lens group GR5 and image plane IMG.

[Specifications of Macro Lens]

Table 7 shows lens data of Numerical example 3 to which specific numerical values are applied to the macro lens of the third embodiment.

TABLE 7

| si | Aspherical surface | ri | di | ni | vi |
|---|---|---|---|---|---|
| 1 |  | 379.123 | 4.00 | 1.7495 | 35 |
| 2 |  | −140.154 | 0.60 |  |  |
| 3 |  | 51.719 | 6.80 | 1.6516 | 58.4 |
| 4 |  | −63.644 | 1.20 | 1.9229 | 20.8 |
| 5 |  | 63.328 | 0.60 |  |  |
| 6 | ASP | 38.193 | 5.52 | 1.8061 | 40.7 |
| 7 | ASP | −325.315 | d7 |  |  |
| 8 |  | 644.204 | 1.20 | 1.8208 | 42.7 |
| 9 | ASP | 21.463 | 6.35 |  |  |
| 10 |  | −32.391 | 1.00 | 1.6645 | 35.8 |
| 11 |  | 36.536 | 4.00 | 1.9229 | 20.8 |
| 12 |  | −78.333 | d12 |  |  |
| 13 | ASP | 91.556 | 2.80 | 1.4971 | 81.5 |
| 14 | ASP | −173.604 | 1.50 |  |  |
| 15 | Aperture stop | ∞ | d15 |  |  |
| 16 | ASP | 61.209 | 4.20 | 1.6188 | 63.8 |
| 17 | ASP | −46.759 | d17 |  |  |
| 18 |  | −273.958 | 4.00 | 1.7859 | 43.9 |
| 19 |  | −30.278 | 1.00 | 1.6477 | 33.8 |
| 20 |  | 102.229 | 12.00 |  |  |
| 21 |  | −25.813 | 1.20 | 1.9229 | 20.8 |
| 22 |  | 77.740 | 7.00 | 1.8830 | 40.8 |
| 23 |  | −37.777 | 12.85 |  |  |
| 24 |  | ∞ | 3.00 | 1.4875 | 70.4 |
| 25 |  | ∞ |  |  |  |

In this macro lens of the third embodiment, both surfaces (the 6th and 7th surfaces) of the positive lens L14 in the first lens group GR1, an image-sided surface (the 9th surface) of the negative lens L21 in the second lens group GR2, both surfaces (the 13th and 14th surfaces) of the positive lens L31 in the third lens group GR3, and both surfaces (the 16th and 17th surfaces) of the positive lens L41 in the fourth lens group GR4 are formed to be aspherical. Table 8 shows the conic constant κ and the aspherical surface coefficients A4, A6, A8, and A10 of 4th order, 6th order, 8th order, and 10th order of each of these surfaces.

TABLE 8

| si | κ | A4 | A6 | A8 | A10 |
|---|---|---|---|---|---|
| 6 | 0.000 | −1.8299E−06 | 0.0000E+00 | 0.0000E+00 | 0.0000E+00 |
| 7 | 0.000 | −1.7738E−07 | 1.4538E−09 | −1.4772E−12 | 0.0000E+00 |
| 9 | 0.000 | −1.1323E−06 | −1.1716E−09 | 3.6123E−11 | 0.0000E+00 |
| 13 | −71.094 | 8.7131E−06 | −4.5590E−08 | 6.5608E−11 | 0.0000E+00 |
| 14 | 0.000 | −9.7690E−07 | −1.1133E−08 | 0.0000E+00 | 0.0000E+00 |
| 16 | 0.000 | −2.0502E−06 | 8.3477E−09 | 0.0000E+00 | 0.0000E+00 |
| 17 | −1.863 | −4.6544E−07 | 8.0228E−09 | −4.6186E−13 | 0.0000E+00 |

This macro lens of the third embodiment has a focal length f of 61.8, an F number Fno of 2.70, and a half angle of view ω of 19.20 degrees.

In this macro lens of the third embodiment, at the time of performing the focusing operation from the object at the infinite to the object at the close distance, a distance on the optical axis between the image plane and each of the first lens group GR1, the third lens group GR3, and the fifth lens group GR5 is constant. On the other hand, the second lens group GR2 travels toward the image side, and the fourth lens group GR4 travels with a traveling amount that is different from a traveling amount of the second lens group GR2. Therefore, a spacing d7 between the first lens group GR1 and the second lens group GR2, a spacing d12 between the second lens group GR2 and the third lens group GR3, a spacing d15 between the aperture stop STO and the fourth lens group GR4, and a spacing d17 between the fourth lens group GR4 and the fifth lens group GR5 vary. Table 9 shows variable spacings of the respective surface spacings in this case, in a state where the position at the infinite object distance is in focus, in a state where the position at the intermediate distance is in focus that allows the shooting magnification to be 0.5, and in a state where the position at the shortest shooting distance is in focus that allows the shooting magnification to be equal magnification.

TABLE 9

| Shooting magnification | 0.0 | −0.5 | −1.0 |
|---|---|---|---|
| Total length of lens | 129.3 | 129.3 | 129.3 |
| d7 | 1.000 | 9.550 | 18.478 |
| d12 | 18.678 | 10.128 | 1.200 |
| d15 | 14.556 | 6.982 | 0.700 |
| d17 | 12.190 | 19.764 | 26.046 |

[Aberration of Macro Lens]

Figure 10A:
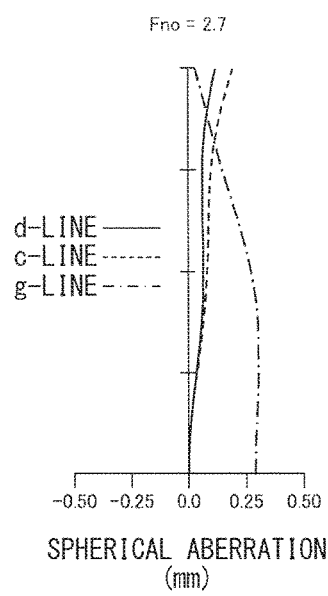
FIGS. 10A to 10C are various aberration diagrams of the macro lens of the third embodiment of the present technology in a state where a position at an infinite object distance is in focus.
Figure 10B:
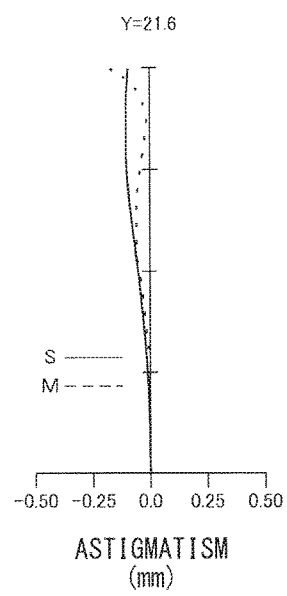
Figure 10C:
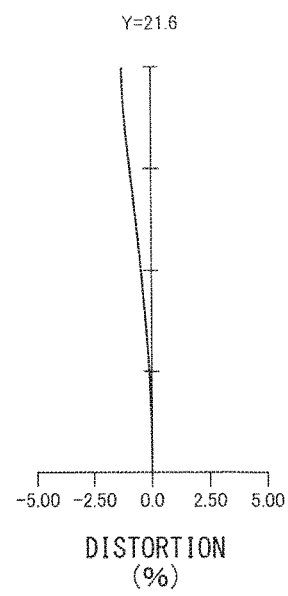
Figure 11A:
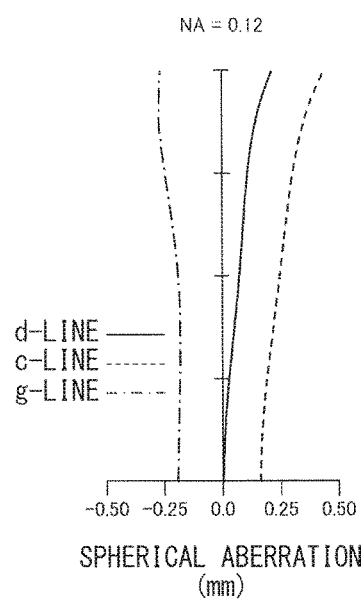
FIGS. 11A to 11C are various aberration diagrams of the macro lens of the third embodiment of the present technology in a state where a position at an intermediate distance is in focus that allows shooting magnification to be 0.5.
Figure 11B:
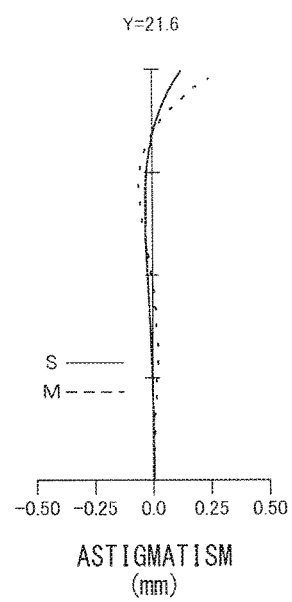
Figure 11C:
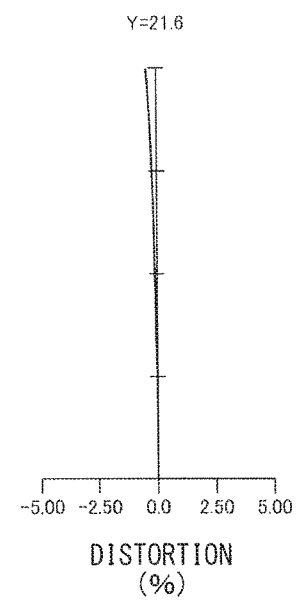
Figure 12A:
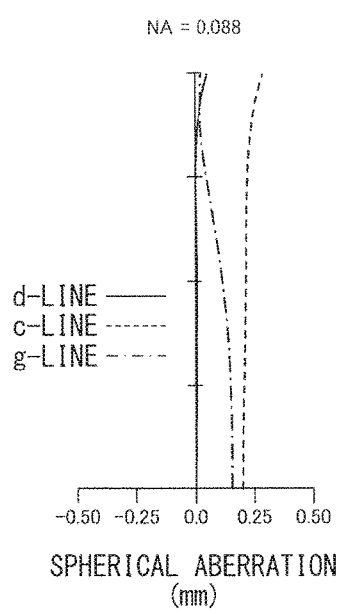
FIGS. 12A to 12C are various aberration diagrams of the macro lens of the third embodiment of the present technology in a state where a position at a shortest shooting distance is in focus that allows the shooting magnification to be equal magnification.
Figure 12B:
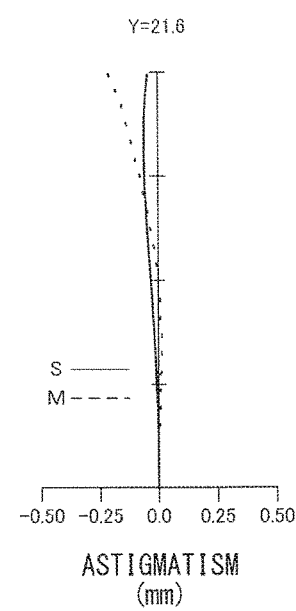
Figure 12C:
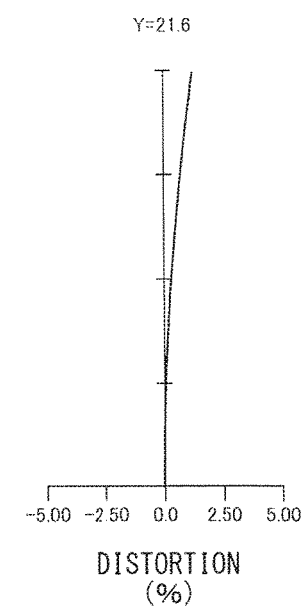

FIGS. 10A to 12C are various aberration diagrams of the macro lens of the third embodiment of the present technology. FIGS. 10A to 10C show aberration diagrams in a state where the position at the infinite object distance is in focus. FIGS. 11A to 11C show aberration diagrams in a state where the position at the intermediate distance is in focus that allows the shooting magnification to be 0.5. FIGS. 12A to 12C show aberration diagrams in a state where the position at the shortest shooting distance is in focus that allows the shooting magnification to be equal magnification. In these diagrams, FIGS. 10A, 11A, and 12A each show a spherical aberration diagram, FIGS. 10B, 11B, and 12B each show an astigmatism diagram (a field curvature diagram), and FIGS. 10C, 11C, and 12C each show a distortion diagram.

It is to be noted that, in these spherical aberration diagrams and spherical aberration diagrams below, a solid line shows values of a d-line (having a wavelength of 587.6 nm), a dashed line shows values of a c-line (having a wavelength of 656.3 nm), and a dashed-dotted line shows values of a g-line (having a wavelength of 435.8 nm). In these astigmatism diagrams and subsequent astigmatism diagrams, a solid line shows values at a sagittal image plane of the d-line, and a dashed line shows values at a meridional image plane of the d-line. In these distortion diagrams and distortion diagrams below, a solid line shows values of the d-line.

As can be clearly seen from the respective aberration diagrams, various aberrations are favorably corrected in Numerical example 3, and the macro lens of Numerical example 3 has superior imaging performance.

[4. Fourth Embodiment]
[Lens Configuration]

Figure 13:
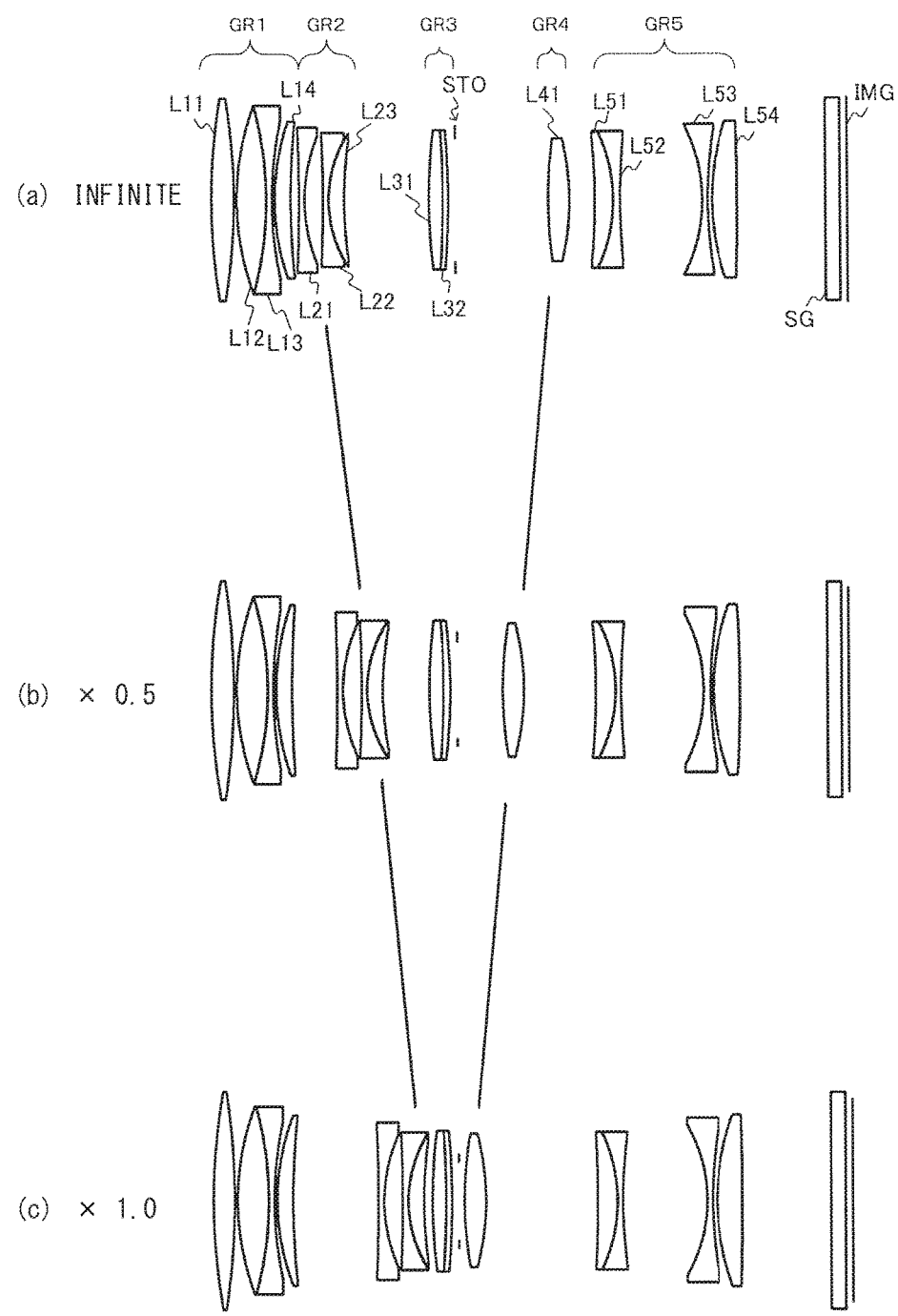
FIG. 13 is a diagram illustrating a lens configuration of a macro lens of a fourth embodiment of the present technology.
Figure 15A:
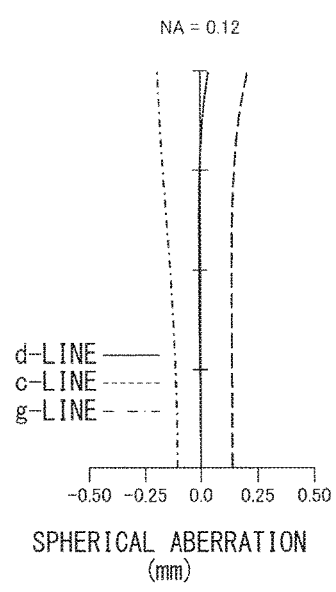
FIGS. 15A to 15C are various aberration diagrams of the macro lens of the fourth embodiment of the present technology in a state where a position at an intermediate distance is in focus that allows shooting magnification to be 0.5.
Figure 15B:
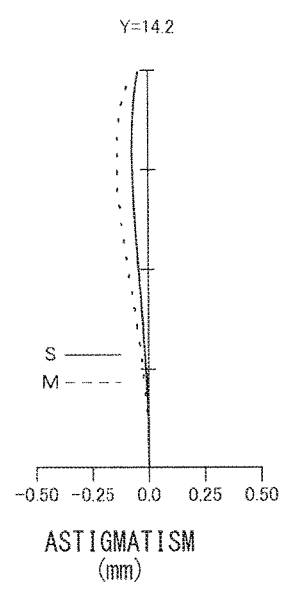
Figure 15C:
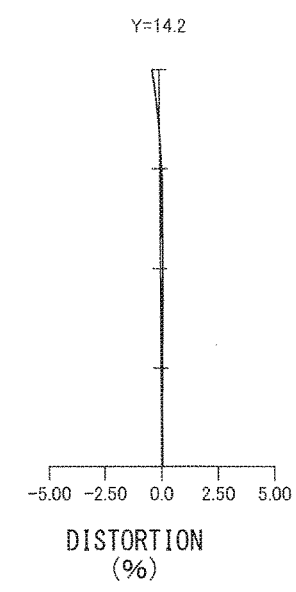

FIG. 13 is a diagram illustrating a lens configuration of a macro lens of a fourth embodiment of the present technology. In FIG. 13, Part (a) shows a lens arrangement in a state where a position at an infinite object distance is in focus, Part (b) shows a lens arrangement in a state where a position at an intermediate distance is in focus that allows shooting magnification to be 0.5, and Part (c) shows a lens arrangement in a state where a position at a shortest shooting distance is in focus that allows the shooting magnification to be equal magnification.

This macro lens of the fourth embodiment includes a first lens group GR1, a second lens group GR2, a third lens group GR3, a fourth lens group GR4, and a fifth lens group GR5 that are arranged in order from the object side. The first lens group GR1 has positive refractive power. The second lens group GR2 has negative refractive power and serves as the first focus lens group. The third lens group GR3 has positive refractive power and serves as the image blur correction lens group. The fourth lens group GR4 has positive refractive power and serves as the second focus lens group. The fifth lens group GR5 has negative refractive power. At the time of performing the focusing operation from the object at the infinite to the object at a close distance, the first focus lens group travels toward the image side, and the second focus lens group travels toward the object side.

The first lens group GR1 is configured of four lenses that are a positive lens L11, a cemented lens configured of a positive lens L12 and a negative lens L13, and a positive lens L14. By allowing the first lens group GR1 to have such a configuration, aspherical aberration, comma aberration, and chromatic aberration are corrected effectively in an entire range of focusing from the infinite to the close distance.

The second lens group GR2 is configured of a negative lens L21, and a cemented lens configured of a negative lens L22 and a positive lens L23. By allowing the second lens group GR2 to have such a configuration, variation in field curvature and in magnification chromatic aberration caused by the focusing operation is corrected.

The third lens group GR3 is configured of a cemented lens configured of a positive lens L31 that has an aspherical surface and a negative lens L32. By allowing at least one surface in the third lens group GR3 to be aspherical, variation in optical performance at the time of the image blur correction is particularly suppressed to a small amount.

The fourth lens group GR4 is configured of one positive lens L41 that has an aspherical surface. By allowing at least one surface in the fourth lens group GR4 to be aspherical, variation in spherical aberration and in field curvature at the time of performing the focusing operation is suppressed.

The fifth lens group GR5 is configured of four lenses that are a negative cemented lens configured of a positive lens L51 and a negative lens L52, a negative lens L53, and a positive lens L54. By allowing the fifth lens group GR5 to have negative refractive power as a whole, a telephoto ratio is improved, and the total length of the macro lens is allowed to be reduced.

It is to be noted that an aperture stop STO is arranged between the third lens group GR3 and the fourth lens group GR4. Further, a filter SG is arranged between the fifth lens group GR5 and image plane IMG.

[Specifications of Macro Lens]

Table 10 shows lens data of Numerical example 4 to which specific numerical values are applied to the macro lens of the fourth embodiment.

TABLE 10

| si | Aspherical surface | ri | di | ni | vi |
|---|---|---|---|---|---|
| 1 |  | 83.883 | 3.10 | 1.7550 | 52.3 |
| 2 |  | −96.620 | 0.40 |  |  |
| 3 |  | 36.248 | 4.35 | 1.6230 | 58.1 |
| 4 |  | −47.110 | 0.80 | 1.8466 | 23.7 |
| 5 |  | 56.382 | 0.40 |  |  |
| 6 |  | 33.473 | 2.20 | 1.6968 | 55.4 |
| 7 |  | 128.648 | d7 |  |  |
| 8 |  | −245.341 | 0.80 | 1.7292 | 54.6 |
| 9 |  | 23.186 | 2.59 |  |  |
| 10 |  | −185.546 | 0.80 | 1.6968 | 55.4 |
| 11 |  | 17.341 | 2.20 | 1.8467 | 23.7 |
| 12 |  | 54.180 | d12 |  |  |
| 13 | ASP | 79.250 | 2.00 | 1.6516 | 58.4 |
| 14 |  | −108.000 | 0.80 | 1.8467 | 23.7 |
| 15 |  | −117.562 | 1.00 |  |  |
| 16 | Aperture stop | ∞ | d16 |  |  |
| 17 |  | 51.551 | 3.00 | 1.5920 | 67 |
| 18 | ASP | −36.771 | d18 |  |  |
| 19 |  | −162.028 | 2.78 | 1.7170 | 47.9 |
| 20 |  | −21.272 | 0.82 | 1.5927 | 35.4 |
| 21 |  | 91.519 | 11.66 |  |  |
| 22 |  | −21.722 | 0.85 | 1.5927 | 35.4 |
| 23 |  | 61.189 | 0.50 |  |  |
| 24 |  | 33.000 | 3.70 | 1.4875 | 70.4 |
| 25 |  | −238.527 | 12.50 |  |  |
| 26 |  | ∞ | 2.00 | 1.5922 | 35.5 |
| 27 |  | ∞ |  |  |  |

In this macro lens of the fourth embodiment, an object-sided face (the 13th surface) of the positive lens L31 in the third lens group GR3 and an image-sided face (the 18th surface) of the positive lens L41 in the fourth lens group GR4 are formed to be aspherical. Table 11 shows the conic constant κ and the aspherical surface coefficients A4, A6, A8, and A10 of 4th order, 6th order, 8th order, and 10th order of each of these surfaces.

TABLE 11

| si | κ | A4 | A6 | A8 | A10 |
|---|---|---|---|---|---|
| 13 | 1.17E−11 | −1.9822E−06 | 5.8709E−09 | −8.4665E−11 | 0.0000E+00 |
| 18 | −1.00E−07 | 6.3997E−06 | 9.9088E−09 | −7.9886E−11 | 0.0000E+00 |

This macro lens of the fourth embodiment has a focal length f of 60.00, an F number Fno of 2.95, and a half angle of view ω of 13.5 degrees.

In this macro lens of the fourth embodiment, at the time of performing the focusing operation from the object at the infinite to the object at the close distance, a distance on the optical axis between the image plane and each of the first lens group GR1, the third lens group GR3, and the fifth lens group GR5 is constant. On the other hand, the second lens group GR2 travels toward the image side, and the fourth lens group GR4 travels with a traveling amount that is different from a traveling amount of the second lens group GR2. Therefore, a spacing d7 between the first lens group GR1 and the second lens group GR2, a spacing d12 between the second lens group GR2 and the third lens group GR3, a spacing d15 between the aperture stop STO and the fourth lens group GR4, and a spacing d17 between the fourth lens group GR4 and the fifth lens group GR5 vary. Table 12 shows variable spacings of the respective surface spacings in this case, in a state where the position at the infinite object distance is in focus, in a state where the position at the intermediate distance that allows the shooting magnification to be 0.5, and in a state where the position at the shortest shooting distance that allows the shooting magnification to be equal magnification.

TABLE 12

| Shooting magnification | 0.0 | −0.5 | −1.0 |
|---|---|---|---|
| Total length of lens | 90 | 90 | 90 |
| d7 | 1.129 | 6.520 | 11.948 |
| d12 | 12.019 | 6.628 | 1.200 |
| d15 | 13.002 | 6.474 | 0.700 |
| d17 | 3.600 | 10.128 | 15.902 |

[Aberration of Macro Lens]

Figure 16A:
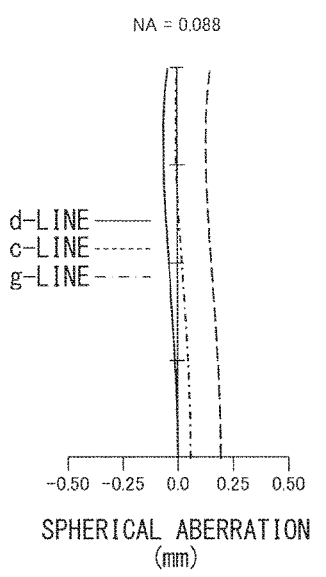
FIGS. 16A to 16C are various aberration diagrams of the macro lens of the fourth embodiment of the present technology in a state where a position at a shortest shooting distance is in focus that allows the shooting magnification to be equal magnification.
Figure 16B:
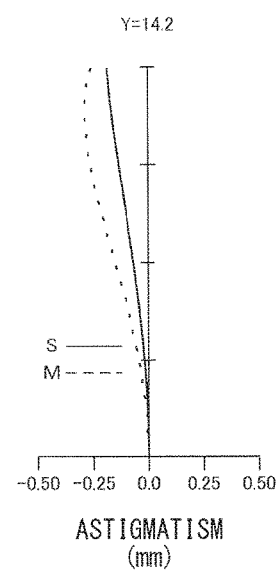
Figure 16C:
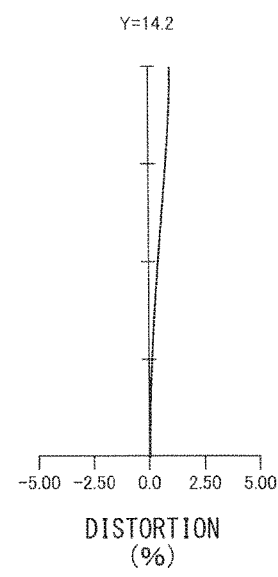

FIGS. 14A to 16C are various aberration diagrams of the macro lens of the fourth embodiment of the present technology. FIGS. 14A to 14C show aberration diagrams in a state where the position at the infinite object distance is in focus. FIGS. 15A to 15C show aberration diagrams in a state where the position at the intermediate distance is in focus that allows the shooting magnification to be 0.5. FIGS. 16A to 16C show aberration diagrams in a state where the position at the shortest shooting distance is in focus that allows the shooting magnification to be equal magnification. In these diagrams, FIGS. 14A, 15A, and 16A each show a spherical aberration diagram, FIGS. 14B, 15B, and 16B each show an astigmatism diagram (a field curvature diagram), and FIGS. 14C, 15C, and 16C each show a distortion diagram.

It is to be noted that, in these spherical aberration diagrams and spherical aberration diagrams below, a solid line shows values of a d-line (having a wavelength of 587.6 nm), a dashed line shows values of a c-line (having a wavelength of 656.3 nm), and a dashed-dotted line shows values of a g-line (having a wavelength of 435.8 nm). In these astigmatism diagrams and astigmatism diagrams below, a solid line shows values at a sagittal image plane of the d-line, and a dashed line shows values at a meridional image plane of the d-line. In these distortion diagrams and distortion diagrams below, a solid line shows values of the d-line.

As can be clearly seen from the respective aberration diagrams, various aberrations are favorably corrected in Numerical example 4, and the macro lens of Numerical example 4 has superior imaging performance.

[5. Fifth Embodiment]
[Lens Configuration]

Figure 17:
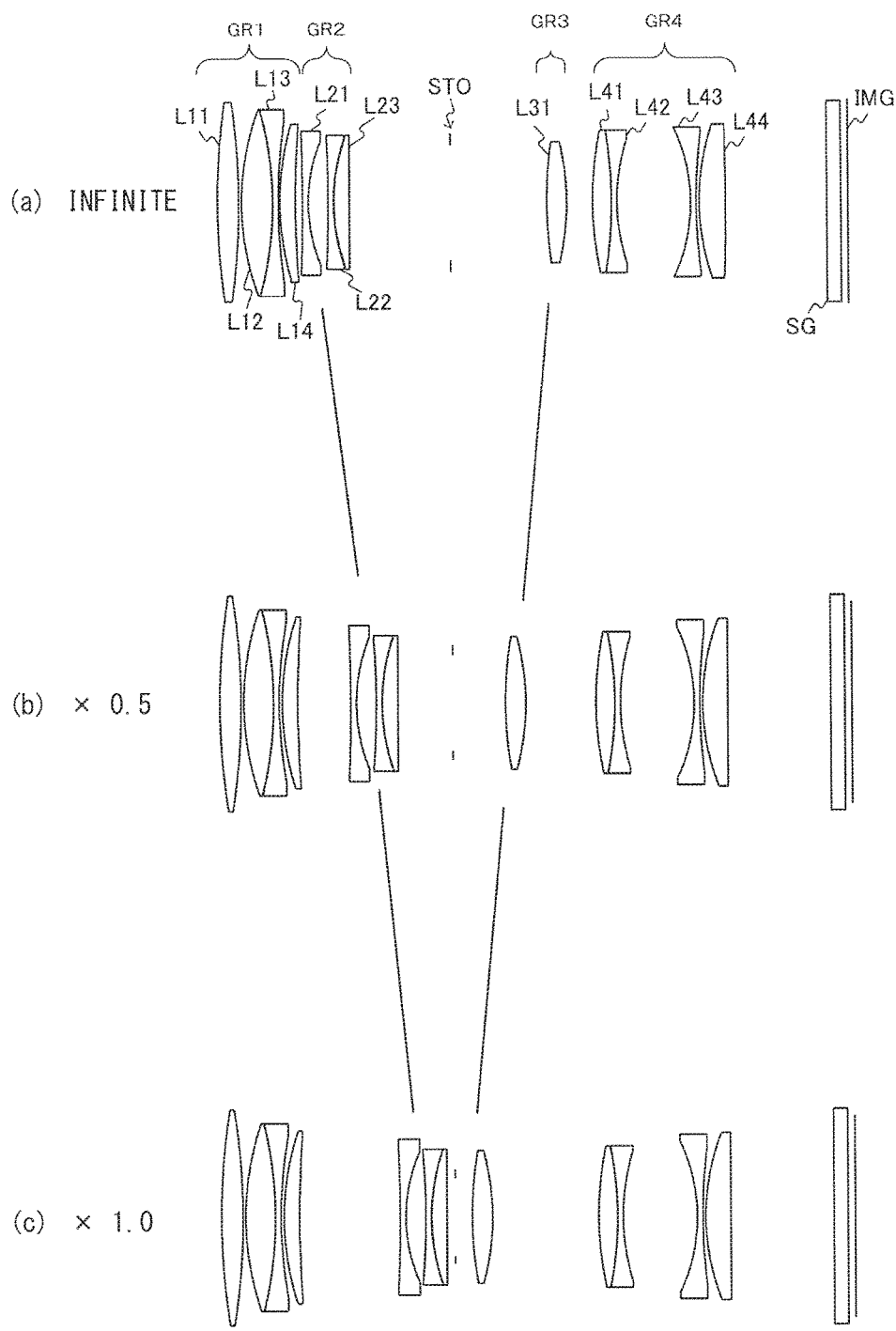
FIG. 17 is a diagram illustrating a lens configuration of a macro lens of a fifth embodiment of the present technology.

FIG. 17 is a diagram illustrating a lens configuration of a macro lens of a fifth embodiment of the present technology. In FIG. 17, Part (a) shows a lens arrangement in a state where a position at an infinite object distance is in focus, Part (b) shows a lens arrangement in a state where a position at an intermediate distance is in focus that allows shooting magnification to be 0.5, and Part (c) shows a lens arrangement in a state where a position at a shortest shooting distance is in focus that allows the shooting magnification to be equal magnification.

This macro lens of the fifth embodiment includes a first lens group GR1, a second lens group GR2, a third lens group GR3, and a fourth lens group GR4 that are arranged in order from the object side. The first lens group GR1 has positive refractive power. The second lens group GR2 has negative refractive power and serves as the first focus lens group. The third lens group GR3 has positive refractive power and serves as the second focus lens group. The fourth lens group GR4 has negative refractive power. At the time of performing the focusing operation from the object at the infinite to the object at a close distance, the first focus lens group travels toward the image side, and the second focus lens group travels toward the object side. It is to be noted that no image blur correction lens group is provided in the fifth embodiment, unlike the above-described respective embodiments.

The first lens group GR1 is configured of four lenses that are a positive lens L11, a cemented lens configured of a positive lens L12 and a negative lens L13, and a positive lens L14 that has an aspherical surface. By allowing the first lens group GR1 to have such a configuration, aspherical aberration, comma aberration, and chromatic aberration are corrected effectively in an entire range of focusing from the infinite to the close distance.

The second lens group GR2 is configured of a negative lens L21, and a cemented lens configured of a negative lens L22 and a positive lens L23. By allowing the second lens group GR2 to have such a configuration, variation in field curvature and in magnification chromatic aberration caused by the focusing operation is corrected.

The third lens group GR3 is configured of one positive lens L31 that has aspherical surfaces. By allowing both surfaces in the third lens group GR3 to be aspherical, variation in spherical aberration and in field curvature at the time of performing the focusing operation is suppressed.

The fourth lens group GR4 is configured of four lenses that are a negative cemented lens configured of a positive lens L41 that has an aspherical surface and a negative lens L42, a negative lens L43, and a positive lens L44. By allowing the fourth lens group GR4 to have negative refractive power as a whole, a telephoto ratio is improved, and the total length of the macro lens is allowed to be reduced.

It is to be noted that an aperture stop STO is arranged between the second lens group GR2 and the third lens group GR3. Further, a filter SG is arranged between the fourth lens group GR4 and image plane IMG.

[Specifications of Macro Lens]

Table 13 shows lens data of Numerical example 5 to which specific numerical values are applied to the macro lens of the fifth embodiment.

TABLE 13

| si | Aspherical surface | ri | di | ni | vi |
|---|---|---|---|---|---|
| 1 | | 97.069 | 3.10 | 1.7550 | 52.3 |
| 2 | | −94.706 | 0.40 | | |
| 3 | | 37.963 | 4.35 | 1.6230 | 58.1 |
| 4 | | −52.190 | 0.80 | 1.8467 | 23.7 |

TABLE 13-continued

| si | Aspherical surface | ri | di | ni | vi |
|---|---|---|---|---|---|
| 5 | | 67.997 | 0.40 | | |
| 6 | ASP | 39.927 | 2.20 | 1.6968 | 55.4 |
| 7 | | 227.934 | d7 | | |
| 8 | | −224.213 | 0.80 | 1.7292 | 54.6 |
| 9 | | 23.508 | 2.84 | | |
| 10 | | −121.647 | 0.80 | 1.6968 | 55.4 |
| 11 | | 28.504 | 2.20 | 1.8467 | 23.7 |
| 12 | | 1436.208 | d12 | | |
| 13 | Aperture stop | ∞ | d13 | | |
| 14 | ASP | 51.841 | 2.85 | 1.5920 | 67 |
| 15 | ASP | −34.845 | d15 | | |
| 16 | ASP | 44.181 | 2.75 | 1.7170 | 47.9 |
| 17 | | −52.126 | 0.80 | 1.5927 | 35.4 |
| 18 | | 29.881 | 10.43 | | |
| 19 | | −23.838 | 0.80 | 1.5970 | 35.4 |
| 20 | | 71.802 | 0.50 | | |
| 21 | | 33.000 | 3.70 | 1.4875 | 70.4 |
| 22 | | −894.856 | 14.49 | | |
| 23 | | ∞ | 2.00 | 1.4875 | 70.4 |
| 24 | | ∞ | | | |

In this macro lens of the fifth embodiment, an object-sided surface (the 6th surface) of the positive lens L14 in the first lens group GR1, both surfaces (the 14th and 15th surfaces) of the positive lens L31 in the third lens group GR3, and an object-sided surface (the 16th surface) of the positive lens L41 in the fourth lens group GR4 are formed to be aspherical. Table 14 shows the conic constant κ and the aspherical surface coefficients A4, A6, A8, and A10 of 4th order, 6th order, 8th order, and 10th order of each of these surfaces.

TABLE 14

| si | κ | A4 | A6 | A8 | A10 |
|---|---|---|---|---|---|
| 6 | 0.00E+00 | −5.2044E−07 | 1.4556E−10 | 0.0000E+00 | 0.0000E+00 |
| 14 | 0.00E+00 | −1.8603E−06 | 7.3464E−08 | 0.0000E+00 | 0.0000E+00 |
| 15 | −9.57E−07 | 2.3926E−06 | 7.3497E−08 | −2.6545E−11 | 0.0000E+00 |
| 16 | 0.00E+00 | −5.1178E−07 | −1.4020E−08 | 0.0000E+00 | 0.0000E+00 |

This macro lens of the fifth embodiment has a focal length f of 60.00, an F number Fno of 2.92, and a half angle of view ω of 13.4 degrees.

In this macro lens of the fifth embodiment, at the time of performing the focusing operation from the object at the infinite to the object at the close distance, a distance on the optical axis between the image plane and each of the first lens group GR1 and the fourth lens group GR4 is constant. On the other hand, the second lens group GR2 travels toward the image side, and the third lens group GR3 travels with a traveling amount that is different from a traveling amount of the second lens group GR2. Therefore, a spacing d7 between the first lens group GR1 and the second lens group GR2, a spacing d12 between the second lens group GR2 and the aperture stop STO, a spacing d13 between the aperture stop STO and the third lens group GR3, and a spacing d15 between the third lens group GR3 and the fourth lens group GR4 vary. Table 15 shows variable spacings of the respective surface spacings in this case, in a state where the position at the infinite object distance is in focus, in a state where the position at the intermediate distance that allows the shooting magnification to be 0.5, and in a state where the position at the shortest shooting distance is in focus that allows the shooting magnification to be equal magnification.

TABLE 15

| Shooting magnification | 0.0 | −0.5 | −1.0 |
|---|---|---|---|
| Total length of lens | 90 | 90 | 90 |
| d7 | 1.000 | 7.438 | 14.103 |
| d12 | 14.303 | 7.865 | 1.200 |
| d13 | 13.705 | 7.484 | 2.450 |
| d15 | 3.605 | 9.826 | 14.860 |

[Aberration of Macro Lens]

Figure 18A:
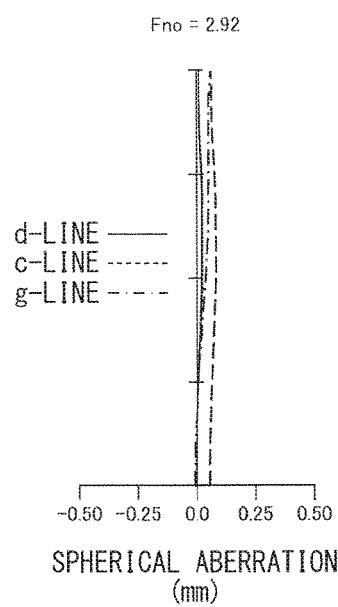
FIGS. 18A to 18C are various aberration diagrams of the macro lens of the fifth embodiment of the present technology in a state where a position at an infinite object distance is in focus.
Figure 18B:
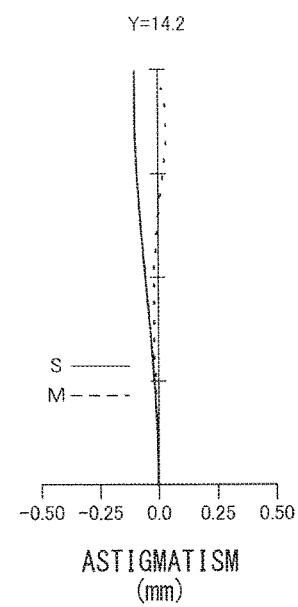
Figure 18C:
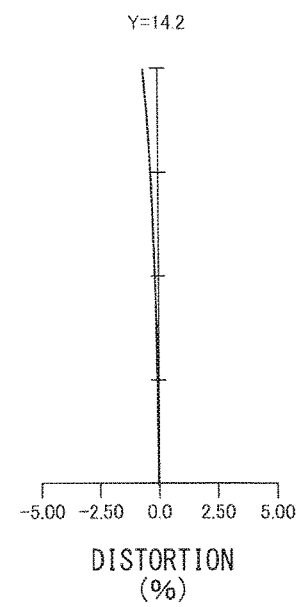
Figure 19A:
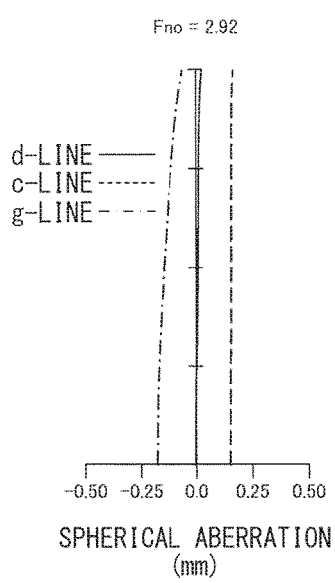
FIGS. 19A to 19C are various aberration diagrams of the macro lens of the fifth embodiment of the present technology in a state where a position at an intermediate distance is in focus that allows shooting magnification to be 0.5.
Figure 19B:
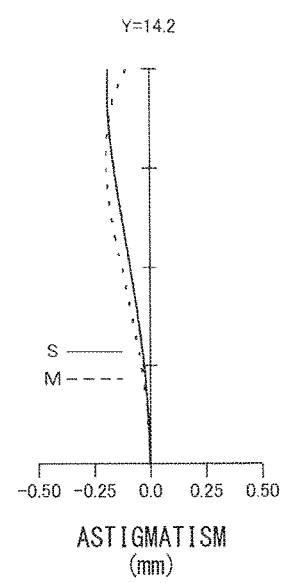
Figure 19C:
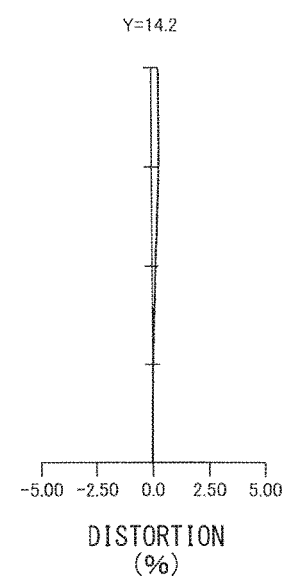

FIGS. 18A to 20C are various aberration diagrams of the macro lens of the fifth embodiment of the present technology. FIGS. 18A to 18C show aberration diagrams in a state where the position at the infinite object distance is in focus. FIGS. 19A to 19C show aberration diagrams in a state where the position at the intermediate distance is in focus that allows the shooting magnification to be 0.5. FIGS. 20A to 20C show aberration diagrams in a state where the position at the shortest shooting distance is in focus that allows the shooting magnification to be equal magnification. In these diagrams, FIGS. 18A, 19A, and 20A each show a spherical aberration diagram, FIGS. 18B, 19B, and 20B each show an astigmatism diagram (a field curvature diagram), and FIGS. 18C, 19C, and 20C each show a distortion diagram.

It is to be noted that, in these spherical aberration diagrams, a solid line shows values of a d-line (having a wavelength of 587.6 nm), a dashed line shows values of a c-line (having a wavelength of 656.3 nm), and a dashed-dotted line shows values of a g-line (having a wavelength of 435.8 nm). In these astigmatism diagrams, a solid line shows values at a sagittal image plane of the d-line, and a dashed line shows values at a meridional image plane of the d-line. In these distortion diagrams, a solid line shows values of the d-line.

As can be clearly seen from the respective aberration diagrams, various aberrations are favorably corrected in Numerical example 5, and the macro lens of Numerical example 5 has superior imaging performance.

[Summary of Conditional Expressions]

Table 16 shows respective values in Numerical examples 1 to 5 according to the first to fifth embodiments. As can be seen clearly from these values, the macro lenses of Numerical examples 1 to 5 satisfy Conditional expressions (a) to (g). Also, as can be seen from the respective aberration diagrams, various aberrations are corrected in favorable balance in the wide end state and in the telephoto end state.

TABLE 16

| | | Numerical example 1 | Numerical example 2 | Numerical example 3 | Numerical example 4 | Numerical example 5 |
|---|---|---|---|---|---|---|
| Conditional expression (a) | AF2 | 67.0 | 81.6 | 63.9 | 67.0 | 67.0 |
| Conditional expression (b) | GF2 | 3.14 | 3.64 | 3.57 | 3.14 | 3.14 |
| | F | 60.00 | 90.00 | 61.80 | 60.00 | 60.00 |
| | F3 | 96.73 | 143.64 | 121.01 | 73.83 | — |
| Conditional expression (c) | F3/F | 1.61 | 1.60 | 1.96 | 1.23 | — |
| Conditional expression (d) | AF3 | 81.6 | 81.6 | 81.6 | 58.4 | — |
| Conditional expression (e) | β5 | 1.49 | 1.36 | 1.48 | 1.56 | 1.34 |
| | F1 | 33.92 | 53.55 | 41.99 | 33.61 | 33.75 |
| Conditional expression (f) | F1/F | 0.57 | 0.60 | 0.68 | 0.56 | 0.56 |
| | F2 | −22.92 | −37.68 | −27.05 | −21.35 | −28.24 |
| Conditional expression (g) | \|F2\|/F | 0.38 | 0.42 | 0.44 | 0.36 | 0.47 |

[6. Application Examples]
[Configuration of Imaging Unit]

Figure 21:
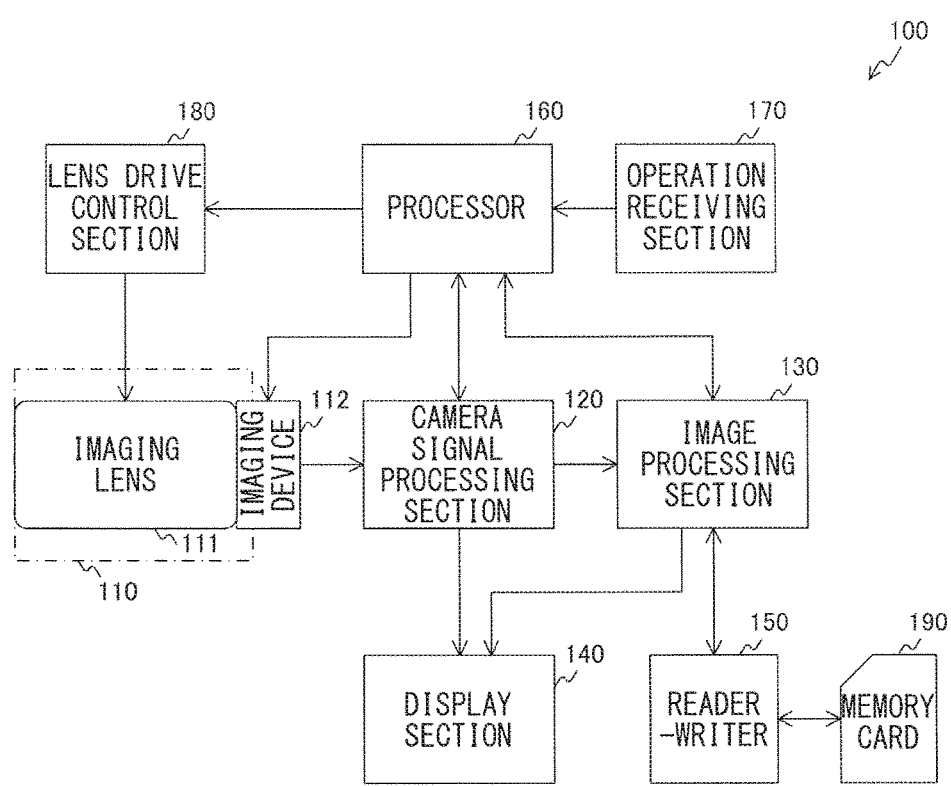
FIG. 21 is a diagram illustrating an example in which the macro lens of any of the first to fifth embodiments of the present technology is applied to an imaging unit 100.

FIG. 21 illustrates an example of application of any of the macro lenses according to the first to fifth embodiments of the present technology to an imaging unit 100. The imaging unit 100 includes a camera block 110, a camera signal processing section 120, an image processing section 130, a display section 140, a reader-writer 150, a processor 160, an operation receiving section 170, and a lens drive control section 180.

The camera block 110 has an imaging function. The camera block 110 includes an imaging lens 111 that is any one of the macro lenses according to the first to fifth embodiments, and an imaging device 112 that converts an optical image formed by the imaging lens 111 into an electric signal. As the imaging device 112, for example, a photo-electric conversion device such as a CCD (Charge Coupled Device) and a CMOS (Complementary Metal-Oxide Semiconductor) may be utilized. As the imaging lens 111, the lens group according to any one of the first to fifth embodiments is simply illustrated as a single lens.

The camera signal processing section 120 performs signal processing such as analog-to-digital conversion of an image signal of a shot image. The camera signal processing section 120 converts an output signal from the imaging device 112 to a digital signal. Further, the camera signal processing section 120 performs various signal processings such as denoising, correction of image quality, and conversion into luminance color-difference signal.

The image processing section 130 performs recording and reproducing processing of the image signal. The image processing section 130 performs processings such as compression coding and extension decoding of the image signal based on a predetermined image data format, and conversion processing of data specification such as resolution.

The display section 140 displays, for example, a shot image, etc. The display section 140 has a function to display an operation state of the operation receiving section 170 and various data such as a shot image. The display section 140 may be configured, for example, of a liquid crystal display (LCD).

The reader-writer 150 performs accessing to a memory card 190 for writing and reading of an image signal. The reader-writer 150 writes an image data that is coded by the image processing section 130 in the memory card 190, and reads image data recorded in the memory card 190. The memory card 190 may be, for example, a semiconductor memory that is attachable and detachable to a slot connected to the reader-writer 150.

The processor 160 controls the imaging unit as a whole. The processor 160 serves as a control processing section that controls each circuit block provided in the imaging unit 100. The processor 160 controls each circuit block based on, for example, an operation instruction signal supplied from the operation receiving section 170 or the like.

The operation receiving section 170 receives an operation from a user. The operation receiving section 170 may be achieved, for example, by a component such as a shutter release button for performing a shutter operation and a selection switch for selecting an operation mode. The operation instruction signal received by the operation receiving section 170 is supplied to the processor 160.

The lens drive control section 180 controls drive of the lens arranged in the camera block 110. The lens drive control section 180 controls a component such as a motor (not illustrated) for driving each lens in the imaging lens 111 based on a control signal supplied from the processor 160.

In the imaging unit 100, in a shooting standby state, the image signal of the image shot by the camera block 110 under control by the processor 160 is outputted to the display section 140 via the camera signal processing section 120, and is displayed as a camera-through image. Further, when the operation receiving section 170 receives the operation instruction signal for zooming, the processor 160 outputs the control signal to the lens drive control section 180, and a predetermined lens in the imaging lens 111 is moved based on the control by the lens drive control section 180.

When the operation receiving section 170 receives a shutter operation, the image signal of the shot image is outputted from the camera signal processing section 120 to the image processing section 130, and the outputted image signal is subjected to compression coding to be converted into digital data having a predetermined data format. The converted data is outputted to the reader-writer 150, and is written in the memory card 190.

A focusing operation may be performed, for example, in a case where the shutter release button is pressed half way in the operation receiving section 170, in a case where the shutter release button is pressed all the way for recording (shooting), etc. In this case, the lens drive control section 180 allows a predetermined lens in the imaging lens 111 to be moved based on the control signal supplied from the processor 160.

When the image data recorded in the memory card 190 is reproduced, predetermined image data is read by the reader-writer 150 from the memory card 190 in accordance with the operation received by the operation receiving section 170. Further, the read data is subjected to extension decoding by the image processing section 130, and thereafter, a reproduction image signal is outputted to the display section 140, and a reproduction image is displayed.

It is to be noted that the example in which the imaging unit 100 is assumed to be a digital still camera has been described in the above embodiment; however, the imaging unit 100 is not limited to a digital still camera. For example, the imaging unit 100 may be widely applicable, for example, to a camera section or the like of a digital input-output apparatus such as a digital video camera, a mobile phone including a camera, and a PDA (Personal Digital Assistant) including a camera.

As described above, according to an embodiment of the present technology, reduction in weight is achieved by configuring the second focus lens group of one positive lens. Therefore, high-speed wobbling is achieved at the time of performing automatic focusing operation, and focusing operation is allowed to be performed at higher speed.

It is to be noted that the above-described embodiment is shown as an example for embodying the present technology, and the respective matters in the above-described embodiment have correspondence with elements in the claims. Similarly, the respective elements in the claims have correspondence with the matters in the embodiment of the present technology designated with the same name. However, the present technology is not limited to the above-described embodiment, and various modifications may be made for the embodiment without departing from its gist to embody the present technology.

It is to be noted that the present technology may have the following configurations.

(1) A macro lens including:
  a first focus lens group having negative refractive power; and
  a second focus lens group arranged closer to an image side than the first focus lens group is arranged and having positive refractive power, wherein,
  at time of performing a focusing operation from an object at infinite to an object at a close distance, the first focus lens group travels toward the image side, and the second focus lens group travels with a traveling amount different from a traveling amount of the first focus lens group, and
  the second focus lens group is configured of only one positive lens.

(2) The macro lens according to (1), wherein following Conditional expression (a) is satisfied, $$55 < AF2 < 100 \qquad \text{Conditional expression (a):}$$

where AF2 is an Abbe number of the positive lens configuring the second focus lens group.

(3) The macro lens according to (1) or (2), wherein following Conditional expression (b) is satisfied, $$2.0<GF2<4.5 \qquad \text{Conditional expression (b):}$$

where GF2 is a specific gravity of the positive lens configuring the second focus lens group.

(4) The macro lens according to any one of (1) to (3), further including an image blur correction lens group arranged between the first focus lens group and the second focus lens group, the image blur correction lens group being configured to be moved in a direction perpendicular to an optical axis and thereby to correct image blur when an optical system is shaken.

(5) The macro lens according to (4), wherein following Conditional expression (c) is satisfied, $$1.0<F3/F<3.0 \qquad \text{Conditional expression (c):}$$

where F3 is a focal length of the image blur correction lens group, and
F is a total focal length of the macro lens in a state where the object at the infinite is in focus.

(6) The macro lens according to (4) or (5), wherein the image blur correction lens group includes one positive lens.

(7) The macro lens according to (6), wherein the image blur correction lens group is configured only of the one positive lens.

(8) The macro lens according to (6) or (7), wherein following Conditional expression (d) is satisfied, $$55<AF3<100 \qquad \text{Conditional expression (d):}$$

where AF3 is an Abbe number of the one positive lens in the image blur correction lens group.

(9) The macro lens according to any one of (1) to (8), further including a lens having substantially no lens power.

(10) A macro lens including:
a first lens group having positive refractive power;
a second lens group having negative refractive power and serving as a first focusing lens group;
a third lens group having positive refractive power;
a fourth lens group having positive refractive power and serving as a second focus lens group; and
a fifth lens group having refractive power and arranged on an image side,
the first to fifth lens groups being arranged in order from an object side along an optical axis,
at time of performing a focusing operation from an object at infinite to an object at a close distance, a distance on the optical axis between image plane and each of the first lens group, the third lens group, and the fifth lens group is constant, the second lens group travels toward the image side, and the fourth lens group travels with a traveling amount different from a traveling amount of the second lens group, and
the fourth lens group is configured of only one positive lens.

(11) The macro lens according to (10), wherein the fifth lens group as a whole has negative refractive power.

(12) The macro lens according to (10) or (11), wherein the fifth lens group includes two negative lenses and one positive lens.

(13) The macro lens according to any one of (10) to (12), wherein following Conditional expression (e) is satisfied, $$1.0<\beta5<1.8 \qquad \text{Conditional expression (e):}$$

where β5 is a lateral magnification of the fifth lens group.

(14) The macro lens according to any one of (10) to (13), wherein following Conditional expression (f) is satisfied, $$0.4<F1/F<0.8 \qquad \text{Conditional expression (f):}$$

where F1 is a focal length of the first lens group, and
F is a total focal length of the macro lens in a state where the object at the infinite is in focus.

(15) The macro lens according to any one of (10) to (14), wherein following Conditional expression (g) is satisfied, $$0.3<|F2|/F<0.6 \qquad \text{Conditional expression (g):}$$

where F2 is a focal length of the second lens group, and
F is a total focal length of the macro lens in a state where the object at the infinite is in focus.

(16) The macro lens according to any one of (10) to (15), further including a lens having substantially no lens power.

(17) A macro lens including:
a first lens group having positive refractive power;
a second lens group having negative refractive power and serving as a first focus lens group;
a third lens group having positive refractive power and serving as a second focus lens group; and
a fourth lens group having refractive power and arranged on an image side,
the first to fourth lens groups being arranged in order from an object side along an optical axis, wherein
at time of performing a focusing operation from an object at infinite to an object at a close distance, a distance on the optical axis between image plane and each of the first lens group and the fourth lens group is constant, the second lens group travels toward the image side, and the third lens group travels with a traveling amount different from a traveling amount of the second lens group, and
the third lens group is configured of only one positive lens.

(18) The macro lens according to (17), wherein the fourth lens group as a whole has negative refractive power.

(19) The macro lens according to (17) or (18), wherein the fourth lens group includes two negative lenses and one positive lens.

(20) The macro lens according to any one of (17) to (19), wherein following Conditional expression (h) is satisfied, $$1.0<\beta4<1.8 \qquad \text{Conditional expression (h):}$$

where β4 is a lateral magnification of the fourth lens group.

(21) The macro lens according to any one of (17) to (20), wherein following Conditional expression (i) is satisfied, $$0.4<F1/F<0.8 \qquad \text{Conditional expression (i):}$$

where F1 is a focal length of the first lens group, and
F is a total focal length of the macro lens in a state where the object at the infinite is in focus.

(22) The macro lens according to any one of (17) to (21), wherein following Conditional expression (j) is satisfied, $$0.3<|F2|/F<0.6 \qquad \text{Conditional expression (j):}$$

where F2 is a focal length of the second lens group, and
F is a total focal length of the macro lens in a state where the object at the infinite is in focus.

(23) The macro lens according to any one of (17) to (22), further including a lens having substantially no lens power.

(24) An imaging unit with a macro lens and an imaging device converting an optical image formed by the macro lens into an electric signal, the macro lens including:
a first focus lens group having negative refractive power; and
a second focus lens group arranged closer to an image side than the first focus lens group is arranged and having positive refractive power, wherein,
at time of performing a focusing operation from an object at infinite to an object at a close distance, the first focus lens group travels toward the image side, and the second focus lens group travels with a traveling amount different from a traveling amount of the first focus lens group, and
the second focus lens group is configured of only one positive lens.

(25) The imaging unit according to (24), further including a lens having substantially no lens power.

It should be understood by those skilled in the art that various modifications, combinations, sub-combinations, and alterations may occur depending on design requirements and other factors insofar as they are within the scope of the appended claims or the equivalents thereof.

What is claimed is:

1. A macro lens comprising: a first focus lens group having negative refractive power and arranged closer to an object side than an image side; a second focus lens group arranged closer to the image side than the first focus lens group is arranged and having positive refractive power, wherein, at time of performing a focusing operation from an object at infinite to the object at a close distance, the first focus lens group travels toward the image side, and the second focus lens group travels only toward the object side and away from the image side with a traveling amount different from a traveling amount of the first focus lens group, and the second focus lens group consisting essentially of one positive lens; and an image blur correction lens group arranged between the first focus lens group and the second focus lens group, the image blur correction lens group being configured to be moved in a direction perpendicular to an optical axis and thereby to correct image blur when an optical system is shaken, wherein the image blur correction lens group includes a positive lens, and wherein the image blur correction lens group is configured only of the positive lens;

Wherein following conditional expression (b) is satisfied, $2.0 < GF2 < 4.5$    Conditional expression (b):

Where GF2 is a specific gravity of the one positive lens of the second focus lens group.

2. The macro lens according to claim 1, wherein following Conditional expression (a) is satisfied, $55 < AF2 < 100$    Conditional expression (a):

where AF2 is an Abbe number of the one positive lens of the second focus lens group.

3. The macro lens according to claim 1, wherein following Conditional expression (c) is satisfied, $1.0 < F3/F < 3.0$    Conditional expression (c):

where F3 is a focal length of the image blur correction lens group, and F is a total focal length of the macro lens in a state where the object at the infinite is in focus.

4. The macro lens according to claim 1, wherein following Conditional expression (d) is satisfied, $55 < AF3 < 100$    Conditional expression (d):

where AF3 is an Abbe number of the positive lens in the image blur correction lens group.

5. The macro lens according to claim 1, wherein, during the focusing operation, the first focus lens group travels toward the image side at a first rate, wherein the second focus lens group travels only toward the object side at a second rate different than the first rate.

6. An imaging unit with a macro lens and an imaging device converting an optical image formed by the macro lens into an electric signal, the macro lens comprising: a first focus lens group having negative refractive power and arranged closer to an object side than an image side; and a second focus lens group arranged closer to the image side than the first focus lens group is arranged and having positive refractive power, wherein, at time of performing a focusing operation from an object at infinite to an object at a close distance, the first focus lens group travels toward the image side, and the second focus lens group travels only toward the object side and away from the image side with a traveling amount different from a traveling amount of the first focus lens group, and the second focus lens group consisting essentially of one positive lens; and an image blur correction lens group arranged between the first focus lens group and the second focus lens group, the image blur correction lens group being configured to be moved in a direction perpendicular to an optical axis and thereby to correct image blur when an optical system is shaken, wherein the image blur correction lens group includes a positive lens, and wherein the image blur correction lens group is configured only of the positive lens;

Wherein following conditional expression (b) is satisfied, $2.0 < GF2 < 4.5$    Conditional expression (b):

Where GF2 is a specific gravity of the one positive lens of the second focus lens group.

7. The imaging unit according to claim 6, wherein, during the focusing operation, the first focus lens group travels toward the image side at a first rate, wherein the second focus lens group travels only toward the object side at a second rate different than the first rate.

8. A macro lens comprising: a first focus lens group having negative refractive power; and a second focus lens group having positive refractive power and arranged closer to an image side than the first focus lens group, wherein, a focusing operation from an object at infinite to an object at a close distance, the first focus lens group moves along an optical axis toward the image side over a first distance, and the second focus lens group moves along the optical axis only toward an object side over a second distance, the second distance being less than the first distance, and the second focus lens group consisting essentially of a single positive lens;

Wherein following conditional expression (b) is satisfied, $2.0 < GF2 < 4.5$    Conditional expression (b):

Where GF2 is a specific gravity of the one positive lens of the second focus lens group.

9. The macro lens according to claim 8, wherein, during the focusing operation, the first focus lens group moves along the optical axis at a first rate, wherein the second focus lens group moves along the optical axis at a second rate different than the first rate.

* * * * *